United States Patent
Cabrera et al.

(12) 
(10) Patent No.: US 6,453,325 B1
(45) Date of Patent: Sep. 17, 2002

(54) METHOD AND MEANS FOR BACKUP AND RESTORATION OF A DATABASE SYSTEM LINKED TO A SYSTEM FOR FILING DATA

(75) Inventors: Luis Felipe Cabrera, Medina, WA (US); Chandrasekaran Mohan, San Jose; Inderpal Singh Narang, Saratoga, both of CA (US)

(73) Assignee: International Business Machines Corporation, Armonk, NY (US)

( * ) Notice: Subject to any disclaimer, the term of this patent is extended or adjusted under 35 U.S.C. 154(b) by 1033 days.

(21) Appl. No.: 08/794,691

(22) Filed: Feb. 3, 1997

Related U.S. Application Data

(63) Continuation-in-part of application No. 08/449,600, filed on May 24, 1995, now abandoned, which is a continuation of application No. 08/716,689, filed on Sep. 16, 1996, now abandoned, which is a continuation-in-part of application No. 08/449,600, filed on May 24, 1995, now abandoned.

(51) Int. Cl.[7] .......................... G06F 12/00; G06F 17/30
(52) U.S. Cl. ...................... 707/204; 707/200; 707/201; 707/203
(58) Field of Search ............................... 707/204, 200, 707/201, 202, 203; 395/182.13, 575, 400, 425, 404; 364/200, 900; 379/265

(56) References Cited

U.S. PATENT DOCUMENTS

| | | | | |
|---|---|---|---|---|
| 4,354,269 A | | 10/1982 | Vries et al. ..................... 371/43 |
| 4,587,628 A | | 5/1986 | Archer et al. ................ 364/900 |
| 4,686,620 A | * | 8/1987 | Ng ............................... 364/200 |
| 5,060,185 A | * | 10/1991 | Naito et al. .................. 364/900 |
| 5,095,420 A | | 3/1992 | Eilert et al. .................. 395/400 |
| 5,163,148 A | * | 11/1992 | Walls ........................... 707/204 |
| 5,237,661 A | | 8/1993 | Kawamura et al. ........... 395/250 |
| 5,241,648 A | | 8/1993 | Cheng et al. ................. 395/600 |
| 5,301,286 A | * | 4/1994 | Rajani .......................... 395/400 |
| 5,317,739 A | | 5/1994 | Elko et al. .................... 395/650 |
| 5,321,832 A | | 6/1994 | Tanaka et al. ............... 395/600 |
| 5,331,673 A | | 7/1994 | Elko et al. .................... 395/575 |
| 5,341,498 A | * | 8/1994 | Connor et al. ............... 707/204 |

(List continued on next page.)

FOREIGN PATENT DOCUMENTS

| | | | |
|---|---|---|---|
| EP | 0593341 A1 | 10/1993 | ......... G06F/15/403 |
| GB | 2184267 | 12/1985 | |
| JP | 2089256 | 3/1990 | |

OTHER PUBLICATIONS

J.E. Gorman et al, "A New Approach To Relational Databases For CAD", IEEE International Symposium on Circuits and Systems Proceedings, pp. 981–985.

(List continued on next page.)

*Primary Examiner*—Frantz Coby
(74) *Attorney, Agent, or Firm*—Baker, Maxham, Jester & Meador

(57) ABSTRACT

In a database system with linkage between data in the database system and files in a system for filing data which is external to the database system ("the filing system"), backup and restoration of the database are coordinated with the filing system. Backup of a referenced file is initiated when the file is linked to the database system. The file backup is asynchronous to the linking process. When database backup occurs, all unfinished file backups are accelerated and completed before the database backup is declared successful. When a database is restored to a state with reference to files in a file manager, the database system causes the file manager to ensure that referenced files are linked to the database system.

11 Claims, 16 Drawing Sheets

U.S. PATENT DOCUMENTS

| | | | | |
|---|---|---|---|---|
| 5,355,477 A | | 10/1994 | Strickland et al. | 395/600 |
| 5,386,545 A | * | 1/1995 | Gonbos, Jr. et al. | 395/575 |
| 5,390,328 A | | 2/1995 | Frey et al. | 395/650 |
| 5,394,539 A | * | 2/1995 | Neuhart et al. | 395/425 |
| 5,446,884 A | * | 8/1995 | Schwendemann et al. | 707/204 |
| 5,448,718 A | * | 9/1995 | Cohn et al. | 395/404 |
| 5,469,503 A | * | 11/1995 | Butensky et al. | 379/265 |
| 5,504,883 A | * | 4/1996 | Converston et al. | 707/204 |
| 5,515,502 A | * | 5/1996 | Wood | 395/182.13 |
| 5,530,855 A | * | 6/1996 | Satoh et al. | 707/204 |
| 5,673,382 A | * | 9/1997 | Cannon et al. | 395/182.04 |

OTHER PUBLICATIONS

D. Isaac, "Hierarchical Storage Management For Relational Databases", Twelfth IEEE Symposium on Mass Storage Systems, Apr., 1993, pp. 139–144.

J.W. Huang, "Multibase: A Heterogeneous Multidatabase Management System", Eighteenth IEEE Annual International Computer Software & Applications Conference, Nov., 1994, pp. 332–339.

R.A. Elmasri et al, "Entity–Relationship Approach—ER '93", 12th Int'l Conference on the Entity Relationship Approach Dec., 1993, pp. 364–375.

R.S. Lorie et al, "Compilation Of Relational Data Statements", IBM Technical Disclosure Bulletin, vol. 22, No. 9, Feb. 1980, pp. 4181–4184.

D.G. Reed et al, "Accessing Data From Disk Files", IBM Technical Disclosure Bulletin, vol. 24, No. 10. Mar. 1992, pp. 4944–4945.

J.M. Munier et al, "Simple Way To Load And/Or Start A Programmed Processor", IBM Technical Disclosure Bulletin, vol. 37, No. 06A, Jun. 1994, pp. 75–76.

N.J. King, "Dynamic Catalog Structure", IBM Technical Diclosure Bulletin, vol. 13, No. 6, Nov. 1970, pp. 1692–1695.

P.J. Ferguson et al, "Reference Code Development Process", vol. 30, No. 11, Apr. 1988, pp. 196–200.

C.E. Clark et al, "Utilizing A Client's I/O Buffer To Stage Data To A Shared Cache", IBM Technical Disclosure Bulletin, vol. 35, No. 2, Jul. 1992, pp. 20–21.

K.P. Eswaran, "Locking Technique In A Relational Data Base: Locking On Intents", IBM Technical Disclosure Bulletin, vol. 18, No. 7, Dec. 1975, pp. 2324–2326.

D. Cornell et al, "Integrated Site Assignment For Relations And Join Operations In Distributed Transaction Processing", IBM Technical Bulletin, vol. 32, No. 4A, Sep. 1989, pp. 306–314.

B.G. Eligulashvili, "Retrieval Optimization In Inverted Files", Programming and Computer Software, vol. 13, No. 6, Nov.–Dec. 1987, pp. 268–271.

T.J. Meijler, et al, "Bridging The Boundaries Between Application: Providing Interactive Interoperability For The End–User", First International Workshop on Interoperability in Multidatabase Systems, Apr. 1991, IEEE, pp. 338–341.

* cited by examiner

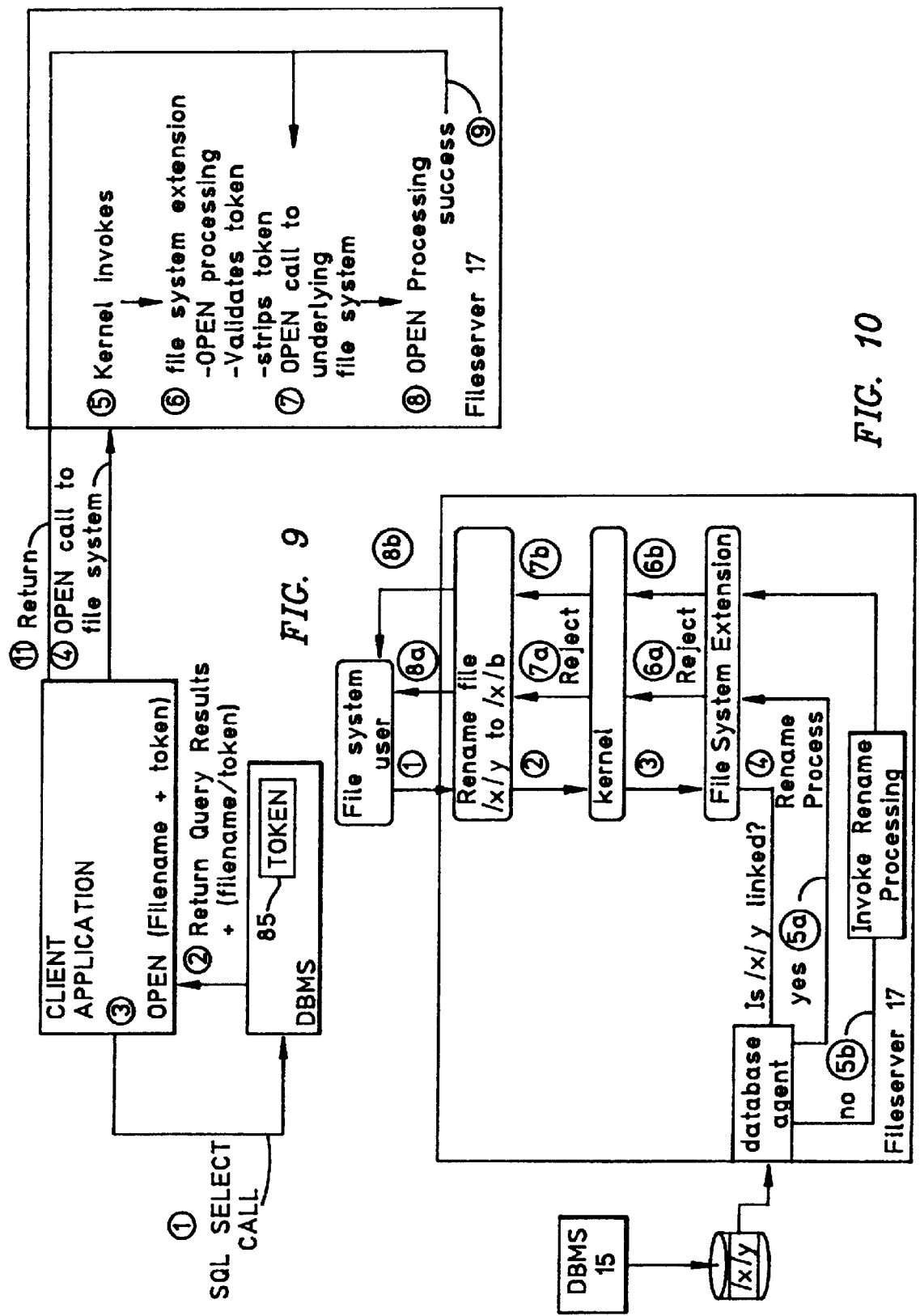

METHOD AND MEANS FOR BACKUP AND RESTORATION OF A DATABASE SYSTEM LINKED TO A SYSTEM FOR FILING DATA

This patent application is a continuation-in-part of U.S. patent application Ser. No. 08/449,600, filed May 24, 1995, now abandoned entitled "Method and Means for Linking A Database System With A System For Filing Data" which is a continuation of Ser. No. 08/716,689 filed Sep. 16, 1996 now abandoned which is a C-I-P of Ser. No. 08/449,600 filed May 24, 1995 now abandoned.

BACKGROUND OF THE INVENTION

1. Field of the Invention

The invention relates generally to database systems and systems for filing data, and particularly to the backup and restoration of a database system whose contents are linked to files stored in a file system that is external to the database system.

2. Description of the Related Art

Generally, a file system is used to "file away" information which a user will later retrieve for processing. With reference to H. M. Deitel, OPERATING SYSTEMS (Second Edition, 1990), Chapter 13, a file system provides a user with the ability to create a file that is "a named collection of data". Normally, a file resides in directly accessible storage and may be manipulated as a unit by file system operations. As Deitel teaches, a file system affords a user the means for accessing data stored in files, the means for managing files, the means for managing direct access storage space where files are kept, and the means for guaranteeing the integrity of files. As is known, there is a class of applications where large data objects such as digitized movies, digitized images, digitized video, and computer-generated graphics are typically captured, processed, and stored in file systems.

With reference to the IEEE Mass Storage Systems Reference Model Version 4, May 1990, developed by the IEEE Technical Committee on Mass Storage Systems and Technology), a Mass Storage System is used to store and administer data objects known as "bitfiles". A bitfile is an uninterpreted sequence of bits, of arbitrary length, possessing attributes relating to unique identification, ownership, and other properties of the data present in the bitfile, such as its length, time of creation, and a description of its nature. A Mass Storage System is able to administer a hierarchy of storage devices for the storage of bitfiles to provide cost effective storage.

When used herein, a system for filing data (also, "a filing system") encompasses file systems and mass storage systems as defined above. The term "file" is hereafter used to denote data stored in a filing system.

C. J. Date, in AN INTRODUCTION TO DATABASE SYSTEMS (Sixth Edition, 1995), Chapter 1, defines a database system as "basically a computerized record-keeping system . . . ". The contents of a database system (records) are defined, organized, and accessed according to some scheme such as the well-known relational model.

A file management component of a file system normally operates at a level above an operating system; access to the contents of the file system requires knowledge at least of the identity of a file. A database system, on the other hand, operates at a level above a file management system. Indeed, as Date points out, a database management system (DBMS) component of a database system typically operates on top of a file management system ("file manager").

According to Date, while the user of a file system may enjoy the ability to create, retrieve, update, and destroy files, it is not aware of the internal structure of the file and, therefore, cannot provide access to them in response to requests that presume knowledge of such structure. In this regard, if the file system stores movies, the system would be able to locate and retrieve a file in which a digitized version of "The Battleship Potemkin" is stored, but would not be able to respond to a request to return the titles of all Russian-language movies directed by Sergei Eisenstein, which is well within the ability of a database system to do.

It may, therefore, be asked whether a database system might not be used to index and provide access to large objects in a file system (such as files that contain digitized versions of Russian-language movies). In fact, a database can provide such a capability. However, in order to provide access to files containing the large objects, the DBMS must possess the facilities to store indexed information of which the objects are composed. Manifestly, such functions would waste the resources of a general purpose database system set up to store, access, and retrieve relatively short objects such as records. Moreover, the raw content of a large object captured in a file system may be so vast as to be impractical to structure for a database request. Typically, features of such an object (such as a digitized image) would be extracted from the file, formatted according to the database system structure, and then used by the database system to support the search of stored objects based on the extracted features. See, for example, the query by image content (QBIC) system and method disclosed in U.S. patent application Ser. No. 07/973,474, filed Nov. 9, 1992 now abandoned, and U.S. patent application Ser. No. 08/216,986, filed Mar. 23, 1994 now abandoned, both of which are incorporated herein by reference.

Such system joinders, moreover, do not provide referential integrity for data stored by the database system. Relatedly, "referential integrity" refers to the guarantee that the database system will not contain any unmatched foreign key values. This guarantee is based upon the consistency of the contents and structure of a database system. Referential integrity guarantees, for example, that if a reference to a file titled "The Battleship Potemkin" is included in a database system response to a request to list all Russian-language movies directed by Sergei Eisenstein, the movie itself (or its digitized form) will exist in the file system and will be named identically in the database and file systems.

The parent application sets out a method and means that link the power of a database system to search data records with the capacity of a file management system to store large data objects, while providing referential integrity to the linkage between the database system and the file management system.

Normal database administration requires that the database system be backed up periodically, for example, once a week. Backup is a necessary first step to restoration of the database system to a known state in case of software corruption or device failure. With backup, one or more copies of the database system contents may be provided from which the database can be restored. When the database contents include references to files in a file system external to the database system, the challenge is to ensure that the files are backed up and restored in coordination with the database. Coordination of database backup with file backup must ensure that when the database is restored, the files referenced by the restored database contents will also be restored to the state they were in when the reference was made.

Once the integrity of the backup is ensured, the backed-up data can be used to restore the database to a consistent state.

Since the contents of the database that are being restored contain references to external files, additional processing is required to coordinate references to the external files with respect to the restored version of the database.

Accordingly, there is a need to coordinate the backup and restoration of a database system whose contents are linked to files that are stored in a file system that is external to the database system.

In this discussion the scope of backup is focused essentially on attribute data in database relations that contain references to files in an external file system. This is not intended to limit the application of the invention described below to a specialized or partial backup.

SUMMARY OF THE INVENTION

The invention is based on the inventors' critical realization that coordination of backup between database contents and external files referenced by those contents may be accomplished reliably by initiating backup of a file when an operation linking the file to the database contents is committed. This performs the actual backup of the files asynchronousely with respect to the transaction and the backup.

Further, the inventors have realized that consistency of the contents of a restored database with external files referenced by the restored contents can be guaranteed with respect to either the point when the backup was made or with respect to files named in the restored contents by causing the file system to retrieve backup copies of the files and to correctly link (or unlink) the retrieved files as required by the restored data system contents.

Therefore, a principal objective of this invention is to provide for the backup and restoration of a database system having contents linked to a filing system that is external to the database system.

BRIEF DESCRIPTION OF THE DRAWINGS

FIG. 9 is a process flow diagram illustrating an OPEN operation.

FIG. 10 is a process flow diagram illustrating how referential integrity of a database system is maintained according to the invention.

DETAILED DESCRIPTION OF THE PREFERRED EMBODIMENT

General Principles and Operations

Figure 1:
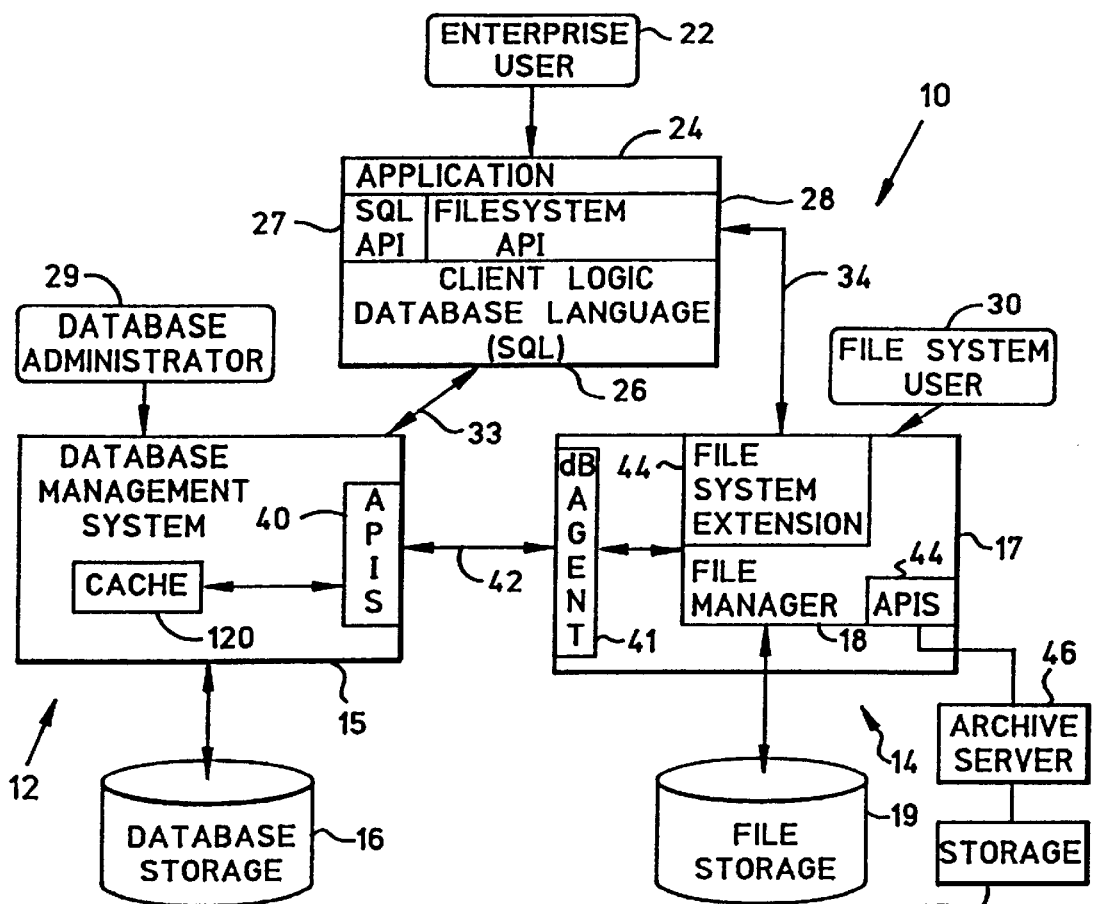
FIG. 1 is a block diagram illustrating an enterprise system architecture according to the invention.

FIG. 1 illustrates an enterprise, a large system complex including one or more processors performing functions that together achieve a common goal, with the processors being linked or coupled to the degree necessary to achieve the goal. The enterprise system is indicated generally by 10 and includes a database system 12 and a file system 14. The database system 12 includes a conventional database management system (DBMS) 15 that provides views of, and access to, a database kept on one or more database storage devices 16. The enterprise system 10 also includes a file system 14 with a file server 17 supporting a file manager 18 that provides storage of, and access to, files in file storage 19. An enterprise user 22 employs conventional processing means (such as a computer or workstation) to support an application program 24 that interfaces with client logic 26. Conventionally, the client logic 26 includes database language commands. A first interface is in the form of a database language application programming interface (API) 27 that operates conventionally between the application 24 and the client logic 26. In addition, the user processing configuration includes a second interface in the form of file system API 28 that provides the enterprise user 22 with access to the file system 14.

A database administrator 29 identifies data to be entered into the database system, decides form and content for the data, and, using a database language, sets up and fills the database. In this latter regard, the database administrator defines data entities and establishes the scheme that supports requests from the enterprise user.

Requests from the enterprise user 22 to the data system 12 and responses to requests are provided on a communication path 33 ("SQL communication path") between the user's processor and the DBMS 15. User requests include retrieval, updating, and deletion of data and addition of new data to the database.

The communication path 34 ("file communication path") between the file system API 28 and file manager 18 enables the enterprise user 22 to create, store, and request files in the file system 14.

In the practice of the invention, one or more application programming interfaces APIs 40 in the DBMS 15 and a database agent 41 in the file management system 17 are the respective terminals of a communication path 42 between the database system 12 and the file system 14 for exchange of information between the systems respecting files in the file system 14. Specifically, the communication path 42 provides the means by which the DBMS 15 provides control information to the file system 14 that causes the file system to control processing of files according to referential integrity constraints established at the database system 12. In this description, the communication path 42 is also referred to as the "control communication path."

The file system 14 may also be accessed by users such as the file system user 30 without the database system 12 as an intermediary.

Preferably, except for the communication path 42, the file system 14 operates independently of, and is external to, the database system 12; that is, its role is not to serve the DBMS 15 in accessing the database storage 16.

In order to support backup and restoration of database system contents, a facility is provided for storing backup copies of files that are referenced by contents of the database system 12. As FIG. 1 shows, the facility provides storage of referenced external files themselves apart from the same backup file where the database system metadata is backed up. Rather, these external files are backed up individually by means of an archive server 46 that interfaces the file manager 18 by way of an application programming interface (API) 44 and that utilizes the storage capacity of a storage hierarchy support facility 47. A representative backup facility for external files is the ADSTAR Distributed Storage Manager (ADSM) product provided by International Business Machines Corporation, the assignee of this patent application.

Figure 2:
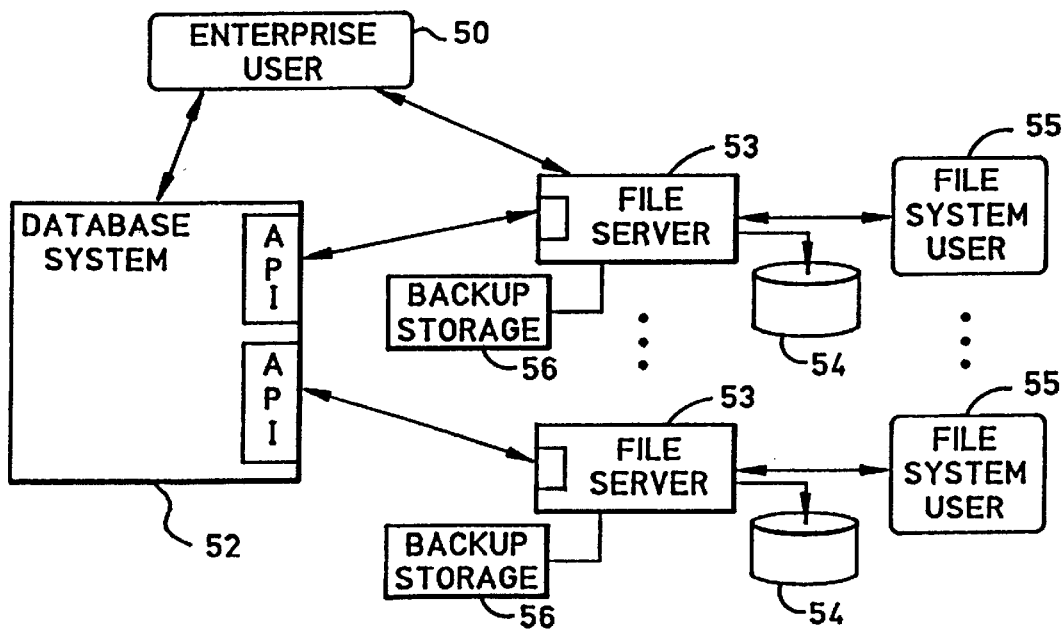
FIG. 2 is a block diagram illustrating a variant of the enterprise system architecture of FIG. 1 in which a file management system includes multiple file servers.

An alternate arrangement of an enterprise system is shown in FIG. 2, and includes an enterprise user 50 coupled to a database system 52 and to a distributed file system including a plurality of file servers 53 with disk storage 54 that may be accessed independently by a plurality of file system users 55. To support backup and restoration of the database system 52, each of the file servers 53 may be provided with backup storage 56 having the architecture illustrated and explained in the previous paragraph with respect to FIG. 1.

In the discussion of the preferred embodiment which follows, it is assumed that the database system that will be discussed is a relational database system (RDBS) and that the database language used with it is SQL. However, it will be manifest to the reasonably skilled artisan that the principles of the invention are not limited to the combination of an RDBS or the SQL language with a file system. Indeed, teachings respecting the preferred embodiment are applicable to other database schemas and languages.

Further, the following discussion uses the term "file system" to denote a system of hardware and software that provides means for retrieval and management of files. When a file system resides in a node which is configured as network of computers, additional software can provide the local/remote transparency for file access. The file system and the additional software is then referred to as "the file server". The discussion assumes that a file server is a component of a particular kind of file system. This is not meant to limit the invention to being practiced only with file systems that include file servers.

Figure 3:
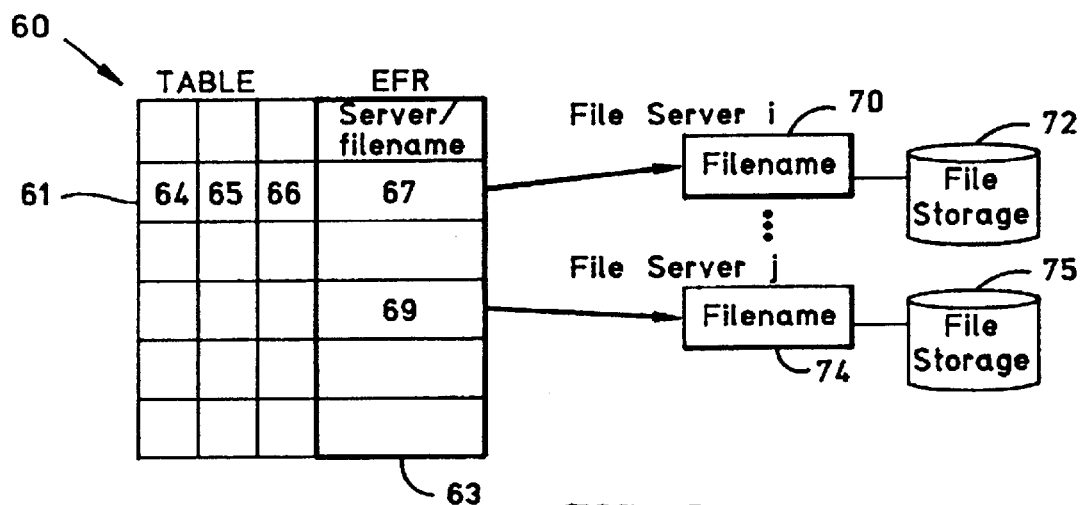
FIG. 3 is a block diagram illustrating specific links between a table in a relational database system and of files in a file system.

Referring now to FIG. 3, a relational database system is based upon the existence of relations that may be illustrated as tables, such as the table 60 in FIG. 3. The table 60 includes a plurality of columns, such as column 63, that essentially define respective fields of table rows, such as the row 61. For example, the four columns of the Table 60 in FIG. 3 establish four fields 64, 65, 66, and 67 of the row 61. In relational database systems, rows are also referred to as "tuples". Table columns, such as column 63, are also referred to as "attributes". Columns may be defined over "data types".

The invention provides for the definition of relations that accommodate existence of an attribute that refers in some way to a file in a file system. For such columns, the invention provides a new data type in the relational database system. This data type is referred to as the "external file reference" (efr) data type. Preferably, the data structure for the efr data type includes the name of a server and the name of a file (filename). Relatedly, assume that column 63 has been defined over the efr data type. Assume further that the field 67 of tuple 61 contains serveri/filename, a reference identifying a file server (server i) that controls a file 70 (filename) in file storage 72. Similarly, the tuple field 69 is an efr data type containing server j/filename, a reference to server j controlling the file 74 stored in the file storage 75.

The novel efr data type provided by this invention supports a database system behavior that causes the DBMS to issue a "LinkFile" ("UnlinkFile") command to an appropriate file server for the named file when an enterprise user issues an SQL insert/update (delete/update) call. The procedures that implement the LinkFile command (described in more detail below) apply constraints to the file. Such constraints include, for example, making a database system the owner of the named file and marking the file as read only. The invention provides this linkage in a transactional scope. The rationale for changing the owner of the file to the database system from a file system user is to prevent the file from being renamed or deleted by file system users, which guarantees the integrity of any reference made in the database system to the file. Marking the file as read only guarantees the integrity of indexes that may be created on the file and stored in the database system for search. Thus, the database link embodied in the LinkFile command applies constraints that prevent renaming or deletion of the file by a file system user once the file is referred to in the database system.

With reference to FIGS. 1 and 3, the invention employs an application such as the application 24 and standard interfaces such as an SQL API 27 for database access and the file system API 28 for standard file system calls (such as open, read, close) to access files. An application scenario would unfold as follows. Assume the application 24 issues an SQL SELECT statement to search on the database in the database storage 16. Assume that the database includes the relation 60. In this regard, the query returns its results, which include one or more server/filename references as normal column data in the efr data structure (assuming any efr column is selected in the query). The application 24 can then use the file system API 28 and the file communication path 34, employing standard file system protocols to access the relevant portion of a file.

Note that the invention does not interpose a database system in the file communication path 34, which provides file access. The operation of the invention only interposes in the file system when a file is opened, renamed, or deleted. Significantly, the invention can, therefore, be used with stream servers (such as video servers) and provide the added value of a robust link between such servers and a database system without the database system being in the file access path.

The invention imposes no data model of its own for applications. The data model is whatever can be supported by the relational model (or any other database scheme).

Figure 4:
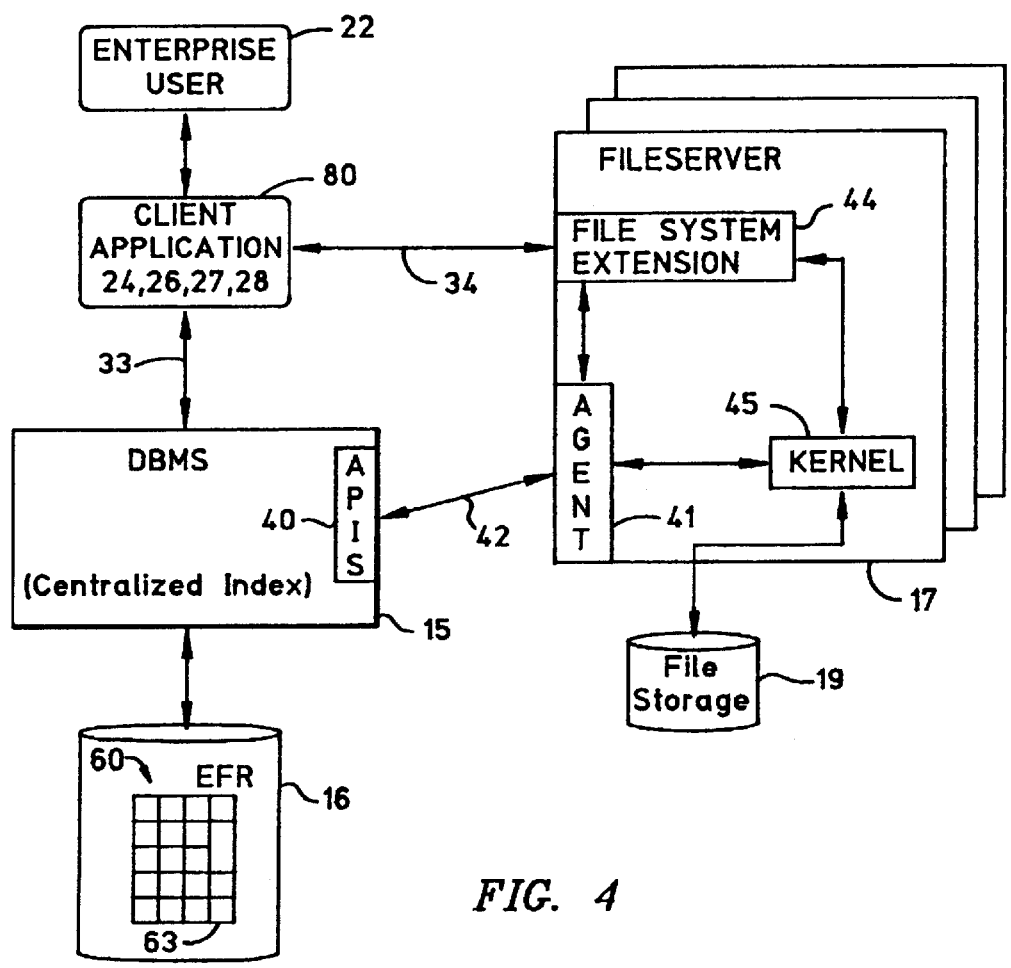
FIG. 4 is a block diagram illustrating a linkage architecture in which the contents of a database system reference external files.

Referring now to FIGS. 3 and 4, the enterprise configuration implicit in FIG. 3 is possible when objects are stored as files in a file server but are linked to a database system by references in database tuples. In this case, the database system can act as a centralized index for searching across the enterprise-wide data that includes both enterprise data and extracted features of non-coded data, and large objects that can be distributed among several file servers. Such a configuration can save network costs since the large objects can be stored close to end users and, therefore, can be delivered over shorter distances. Note that such a configuration would not be possible if the large objects were stored in the database system.

FIG. 4 illustrates an essential architecture for a combination of the enterprise system illustrated in FIG. 1 and the efr data type that allows the definition of relations such as the relation 60 in FIG. 3. In FIG. 4, a client application 80 includes the application 24, client logic 26, SQL API 27, and file system API 28 of FIG. 1 that represent the enterprise user 22. The client application 80 communicates with the DBMS 15 by the SQL communication path 33 and communicates with the file server 17 by the file communication path 34. The DBMS 15 and file server 17 are coupled by the control communication path 42 over which the APIs 40 communicate with the database agent 41. The database stored at 16 includes one or more relations with efr data types, such as the table 60 of FIG. 3. The essential architecture of FIG. 4 provides a centralized database system with distributed file servers. The invention is implemented in standard API's for database and file system access. The architecture requires no modification of any file manager in any file server.

Figure 5:
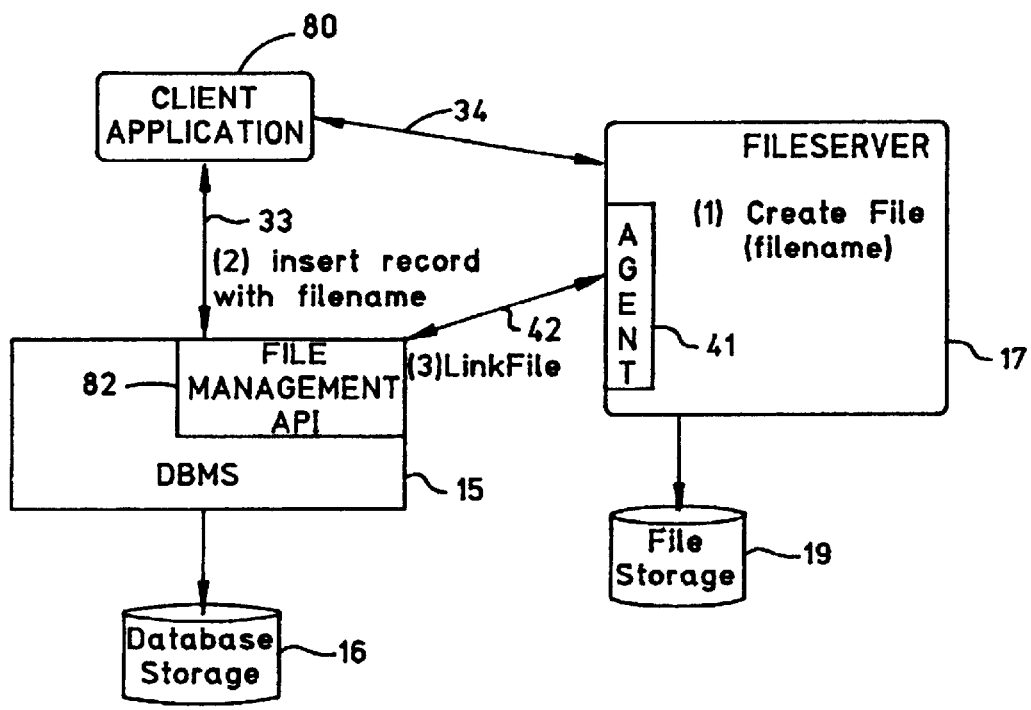
FIG. 5 is a process flow diagram illustrating a database LinkFile operation performed in the architecture of FIG. 4 according to the invention.

FIG. 5 illustrates a three-step LinkFile operation. In step (1) the file with the name filename is created in the file server 17 and passed to the client application 80 over the file communication path 34. In step (2), the client application 80 requests on SQL communication path 33 the insertion of a record with an efr field containing server/filename into the database stored at 16. In response to the request to insert the record, a file management API 82 in the API 40 "links" the file filename by asserting control over the file; this is step (3). Control is asserted by a LinkFile command provided by a file management API 82 (one of the APIs 40) to the database agent 41 on the control communication path 42. The LinkFile command names the file, specifies a type of access control to be applied to the specified file, and conditions a readOnly flag contained in the structure of the command to indicate whether or not the file is to be maintained in the readOnly state. The database agent 41 recognizes the command and responds to it by denoting the DBMS 15 as the "owner" of the file in the file system, thereby preventing any file system user from renaming or moving the file. The agent 41 appropriately sets a readOnly field in a file system directory according to the condition of the corresponding flag in the command. In denoting the DBMS 15 as the owner of the file at the file server 17, the LinkFile command prevents the named file from being renamed, moved, or deleted by any file system user for so long as it is linked to the database system by the reference to filename in the record inserted in step (2). This guarantees referential integrity of the reference in the inserted record.

Figure 6:
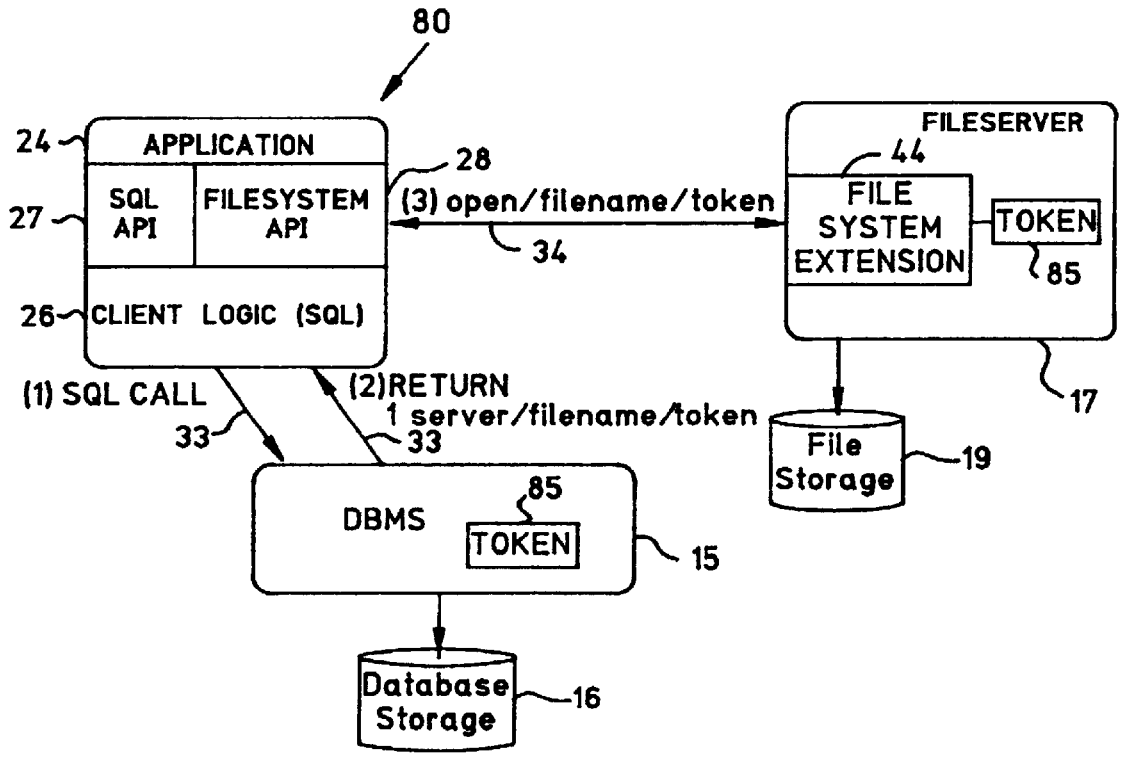
FIG. 6 is a process flow diagram illustrating a read operation performed in the architecture of FIG. 4.

FIG. 6 is a flow diagram illustrating an example of reading a file using the invention. In the description, it is assumed that file system users must be authorized to access a file server. In this regard, each file server maintains an agent, typically a file system extension such as the file system extension 44, to impose security constraints including a check of authority of users to access files. Similarly, the database system includes an authorization manager that imposes security constraints including a check of a user's authority to access the database. The challenge of the architecture illustrated in FIG. 4 is to afford an enterprise user access to the file system in such a manner as not to proliferate authorization procedures for every file server from which the enterprise user seeks a file. The solution provided by the invention is to authorize the DBMS to access files which it has "linked" by way of the LinkFile command as described above. Relatedly, a token 85 (FIG. 6) signifies the DBMS's access authority. The token is generated by the DBMS 15, using the name of the file which is to be accessed. The file system extension 44 possesses a routine to decode the token 85 which was generated by DBMS and validate it. If the token 85 is not provided by the user in the open call, then the file-access-permissions of the file system would decide whether the file is allowed to be accessed or not. If a file's ownership was changed to DBMS, then a normal user cannot access the file without providing the token.

In the three-step procedure for reading files that is illustrated in FIG. 6, it is assumed that an enterprise user represented by the client application 80 is authorized to access the database system. The database request is passed to the DBMS 15 via 24, 27, 26, and is issued by the client logic 26 as an SQL call to read filename in step (1) on the SQL communication path 33. Assuming that the DBMS 15 has linked the file, it searches its relations conventionally, finds the tuple and its efr column with the provides the server name that owns the file filename and returns, in step (2) the data structure server/filename/token, having generated and appended a copy of the token 85 to the returned data structure. The return is made on the SQL communication path 33, received by the client logic 26 and passed to the file system API 28. In step (3), the file system API 28 issues, on the file communication path 34, a request to open filename and appends the copy of the token to the request. The request sent to the file server 17 by the file system API 28 has the form open/filename/token. The file system extension 44 authorizes the operation after validating the token 85 by using filename as one of the arguments for the decoding routine maintained in the file server 17. The file is then streamed to the user through the file system API 28 on the file communication path 34. It should be noted that the invention employs the SQL API 27. for database system access and the file system API 28 for file access and, further, that there is direct data delivery of the file on the file communication path 34 between the client application 80 and the file server 17 with the DBMS 15 entirely out of the data path 17, 34, 28, 24.

Extensions to DBMS for efr Data Type Processing

Figure 7:
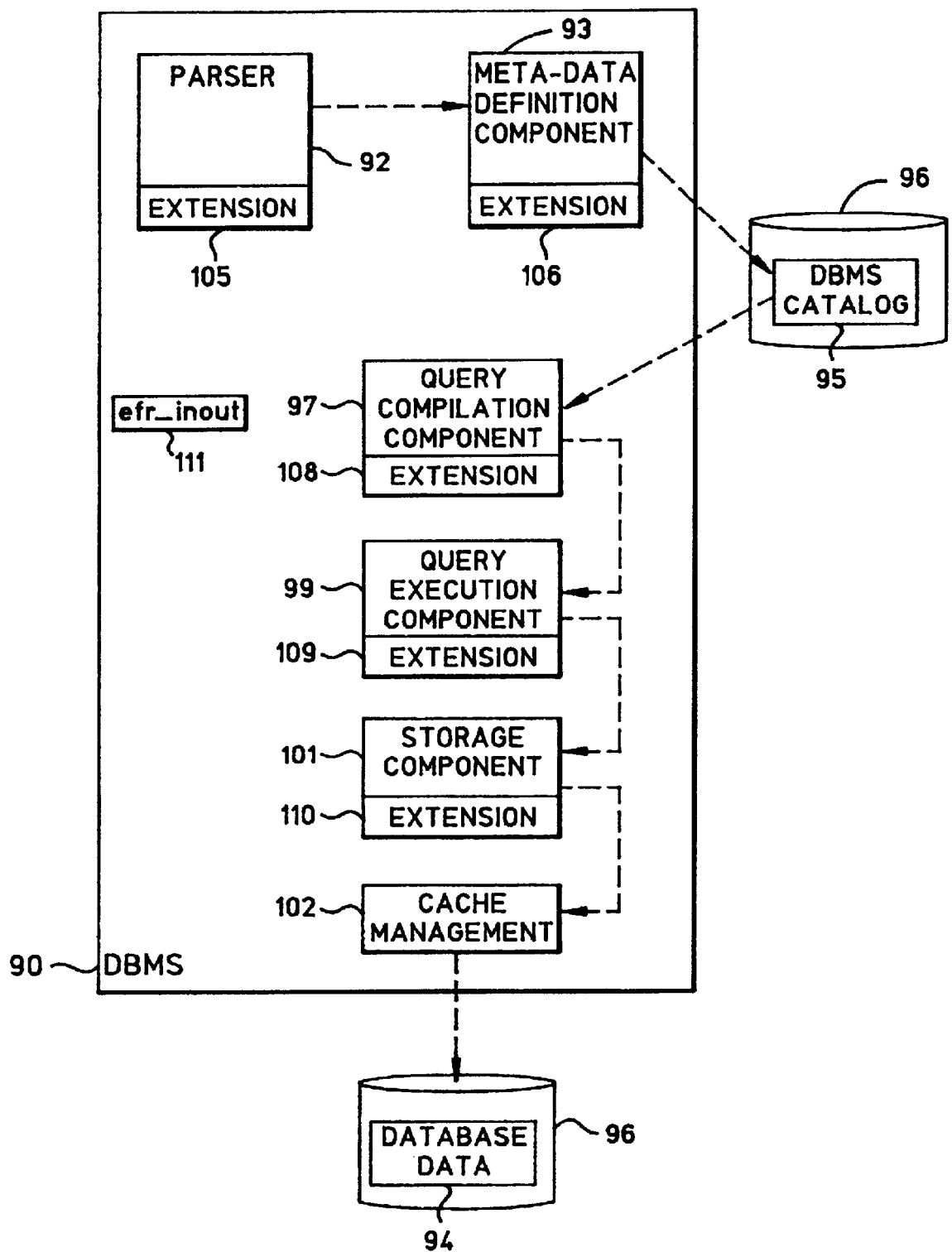
FIG. 7 is a block diagram showing components of a database management system.

Refer to FIG. 7 which illustrates extensions required to practice the invention in a conventional database management system as would be found, for example in a commercially available RDMS. In FIG. 7, the database management system (DBMS), indicated generally by reference numeral 90, includes a query parser 92, a meta-data definition component 93, a DBMS catalog 95, a query compiler 97, a query executor 99, a storage component 101, and cache management 102. Database data 94 and the DBMS catalog 95 are stored on a conventional direct access storage device, such as a disk 96. The dotted lines indicate interaction between the components of the DBMS 90. These components are conventional in all respects save extensions 105, 106, 108, 109, and 110. Relatedly, the query parser 92 parses and translates SQL statements into low-level procedures. In this regard, when a user defines a column in a query language, such as SQL, the query parser translates the column into one or more low-level procedures that implement the column. It is assumed that a user can define a column of type efr in the query language and the extension 105 enables the query parser 92 to accept efr as a valid token or element in the column definition.

The meta-data definition component 93 tracks relational tables, column definitions, and their data-types in the DBMS catalog 95. The extension 106 enables the meta-data definition component 93 to validate the efr data-type for columns which are defined as such when a table is defined. The extension 106 also enables the meta-data definition component 93 to define a group when an efr column is defined in a table. When the table is dropped, the group is undefined.

The query compiler 97 accepts SQL query statements such as INSERT, DELETE, UPDATE, and SELECT from an application program, recognizing the columns and their data types involved in the input or the output of the query by looking them up in the DBMS catalog 95, recognizing predicates specified on certain columns (if any) and compiling the query for efficient processing by the DBMS 90. Configurable parameters for these statements, such as the name of a file, file type, file location, and the number of file copies are provided by the client application to the DBMS in a data structure efr_inout 111. The query compiler 97 also calculates memory which should be reserved for query execution based on columns involved. By virtue of the extension 108, the query compiler 97 looks to the DBMS catalog 95 to determine whether a column is of an efr type. For an efr column, query compiler 97 estimates memory in terms of the size of the file name, which is a contained in efr_inout 111.

The query executor 99 is responsible for allocating memory in the DBMS address space for a query as determined by the query compiler 97, moving from (or to) data values for each column based on an SQL query such as INSERT (or SELECT), performing any data conversions for compatible data types, and invoking storage component 101 of the DBMS 90. The extension 109 enables the query executor 99 to describe expected input and output data values for an efr column in the efr_inout data structure.

The query executor 99 provides (or receives) the data values of each column to (from) the storage component 101 for INSERT/UPDATE (or SELECT) calls. For a DELETE call, the query executor 99 simply issues a delete-record call to the storage component 101. For an INSERT call, the storage component 101 is responsible for formatting the database record which is to be persistently stored in the database, 20 updating indexes which are defined on specific columns, and logging the database record. In case of transaction abort or DBMS crash, transaction management (not shown) invokes the storage component 101 to process the log-record which it created.

For an efr column, a user can provide values in the efr_inout data structure or specify NULL. The NULL value for the value is tracked just as any nullable column for other data types. The non-NULL value provided by efr_inout is transformed to the storage format. For example, a server-name is transformed into server-id after looking up a file server configuration file defined in the DBMS 90. A generation-id is provided by the database agent 41 when a file with this filename is linked. If the filename does not exist in the identified file server, the INSERT call is failed with an appropriate return code. Furthermore, the log-record for the link file operation may be written. This is so that in case of undo processing of the SQL statement, the storage component 101 can inform the database agent 41 to perform an undo procedure by an unlink-file operation.

For a SELECT call, the storage component 101 retrieves the database record from the database efficiently based on query compilation. Values of different columns which are requested in the query are returned to the query executor 99.

For an UPDATE call, processing is similar to the INSERT call, except that the database record is first retrieved, and then formatted with the values of the unmodified columns and the values of the columns which are to be modified provided in the UPDATE call.

With respect to the extension 110 of the storage component 101, when an efr column is updated, it is assumed the application provides either of two values: NULL or server/filename. When the value is set to NULL, the storage component 101 issues the unlink-file command to the database agent 41 for the file which is referenced in the efr field of the record. Otherwise, server/filename is provided in the efr_inout data structure. Relatedly, if the stored value is NULL, then the record is updated to mark the value as not-NULL with the processing as described for the INSERT call. If the server-id of the input value is the same as the one in the stored column, but the filename is different, then the storage component 101 issues an unlink-file command for the filename referred by the stored column, and a link-file command for the filename provided in the efr_inout. If the server-id of the input value is different than the one stored in the stored column, then the storage component 101 contacts the file server referred by the stored column and issues an unlink-command to that file server for the file name currently stored. The storage component 101 then contacts the file server referred to by the efr_inout and issues a link-file command for the filename provided by it.

For the DELETE call, processing by the storage component 101 requires marking the space for the record free after retrieving the page containing the record, updating the indexes on the specified columns, and writing the log-record. Then, when an efr column is defined, the storage component 101 extracts information such as the server-id and filename from the stored column, contacts the database agent in the named file server and issues an unlink-command for the named file. Furthermore, the log-record for the UnlinkFile operation may be written so that if undo processing of the SQL statement is required, the storage component 101 can inform the database agent to do its undo, that is relink the filename.

Refer now to FIGS. 1, 4, and 7 and to Appendix I where an understanding of specific operations of the DBMS 15 according to the invention. Appendix I describes the APIs 40 that are executed during these operations. Those skilled in the art will recognize that each API description illustrates a preferred embodiment and best mode design definition for a C language software procedure or computer program which may be compiled and executed on a digital computer.

In the invention, the DBMS 15 interacts with a database agent, such as the database agent 41, when processing database data structures containing references to files in a file system wherein the database agent resides. In the context of an RDMS that uses a relational database language such as SQL, there is a possibility that one or more of at least five file-referencing processing operations would occur. These operations include creation of a table, insertion of a record, reading of a record, deleting or updating of a record, and dropping a table.

When a table is created in an RDMS, the invention is practiced in a DBMS such as the DBMS 15 by definition of a group that is assigned a file group name. A file group management API (one of the APIs 40), such as is illustrated in Appendix I, participates in table creation by issuing a DefineGroup command having the syntax illustrated in Appendix I. In the context of FIG. 1, this command is provided on the control communication path 42 to the database agent 41. The file group management API of Appendix I thus provides control information in the form of a group name that is used to control processing at the file system or file server of any file or files that are included in a group files identified by the group name.

When a record having a reference to a file in a file system is inserted into a database table that includes a column defined over an efr data type, a file management API illustrated in Appendix I operates to place the file under the control of the database agent in the file server where the file is located. In response to insertion of such a record, control information is provided on the communication path 42 to the database agent 41 and a LinkFile command that is illustrated and described in the description of the file management API in Appendix I is issued. The LinkFile command that is issued identifies the file group under which the file is to be linked and specifies access control to be applied to the file. The control (described above) is implemented by the database agent 41 and includes marking the DBMS 15 as the owner of the file which prevents any file system user from renaming or moving the file. In the LinkFile command illustrated and described in Appendix I, a readOnly flag is included in the command. Preferably, this flag is conditioned to inform the database agent 41 whether or not to maintain the identified file as a "readOnly" file, thereby further controlling processing of the file at the file system. Importantly, as Appendix I illustrates and describes, the LinkFile command can be used to control processing of one file or more than one file in the file system.

When a database record having efr field with a value that contains a reference to a file in file system is deleted from a table or updated, the file management API returns control of the file to the file system by means of the UnlinkFile command that is illustrated and described in Appendix I. Importantly, the UnlinkFile command either returns control of the file to the file system or initiates file system processing to delete the file from the file system.

When a table including one or more columns defined over the efr data type is dropped from the database system, the file group management API in the DBMS issues a DeleteGroup command by which the file system where the files are located is enabled either to reacquire control of the file or files in the group or to delete the file or files altogether.

The following are examples of these DBMS operations in the context of commands that are specific to the well-known structured query language ("SQL"). While SQL is a specific instantiation of a database language, the inventors do not intend to limit this invention to being implemented only in SQL. Those skilled in the art will realize that the teachings in this entire document are broadly applicable to other database languages. For an understanding of SQL, reference is made to J. R. Groff, et al., LAN Times Guide to SQL, (1994), and to the Date reference previously cited.

Examples of efr Data-Type Processing
DEFINING EFR COLUMN IN A TABLE

In the example, assume an SQL CREATE statement is used to create a table with an efr column. For example, assume c3 is defined as an efr column.

CREATE TABLE t1 (
   c1 integer,
   c2 char(40),
   c3 efr
)

The processing specific to the efr column is as follows:

1. The query parser 92 recognizes that c3 is an efr column; and
2. metadata-definition component 93 marks c3 as an efr column in the RDBMS catalog 95. It also defines a group with name t1.c3 in the database agent 41 using DefineGroup. The group is defined in the transactional scope by starting BeginTxn if one is not already started.

INSERTING A DATA-RECORD IN TABLE T1

In the example, assume an SQL INSERT statement is used to insert a record with an efr field into the table created in the previous example. In this regard, values for the efr column are set as follows via efr_inout data structure.

efr_inout.servername='server 1'
efr_inout.file_prefix_len=8
efr_inout.file_stem_name=11

INSERT INTO TABLE t1
   (c1, c2, c3) VALUES
   (5, 'John Doe', efr_inout)

The processing specific to the efr column is as follows:

1. The query compilation component 97 looks up the RDBMS catalog 95 for the datatype of each column. It prepares the query for execution by marking the datatype of each column and estimating space for datavalues. In the case of an efr column the space is estimated as the size of efr_inout and maximum allowable size of the filename. (The max size of filename is a configurable parameter for a DBMS);
2. The query execution component 99 allocates the memory estimated by the query compilation component 97. It copies the values of the efr_inout and the filename specified by the application to the RDBMS address space. It sets up parameters for each column (datatype, length, non-null indicator, data-values) to be processed by the storage component 101. For the efr column, the data-values are efr_inout plus the filename; and
3. For the efr column, the storage component 101 examines the efr_inout to determine the server-name, starts the BeginTxn if one is not already started with that server, writes the log record for the LinkFile operation, and issues LinkFile providing it the filename, groupname (and other parameters). If the file does not exist, database agent 41 would tell it via return code and the INSERT call is failed. Otherwise, the storage component 101 continues its processing to format the efr-column in memory to the stored format. The stored format is as follows: length of the fixed-part of the column-data plus the filename, fixed part of the column-data, and the filename. From hereon, normal RDBMS processing would cause the data record to be stored in a page and make it persistent.

READING A DATA-RECORD IN TABLE T1

In this example, assume an SQL SELECT statement is used to read an efr field in a record.

SELECT c3 FROM t1
   WHERE (c1=5)

The processing specific to the efr field is as follows:

1. The query compilation component 97 determines the access path by which to access the record with predicate of (c1=5);

2. The query execution component 99 orchestrates access to the record with (c1=5). It invokes the storage component 101 to access the record;
3. The storage component 101 sets up the following parameters for each column (datatype, length, null or not null, address of datavalue). For the efr column which is non-NULL, this implies (efr, length=(fixed-part of the column+the filename), non-null, data-value= (address of the efr column in the data-record); and
4. The query execution component 99 then transforms from the stored column format to the efr_inout data structure, if the stored value is not NULL. It then assigns an access-token for the filename as per using the agreed upon function to use between the file system extension 44 and the DBMS. The efr_inout and the filename+access-token is then copied to the memory location specified by the application program.

UPDATING A DATA-RECORD IN TABLE T1

In this example, assume an SQL UPDATE statement is used to change the contents of the table.

UPDATE TABLE t1
  SET c3=NULL
  WHERE (c1=5)

The processing specific to the efr column is as follows:
1. The query compilation component 97 operates in the same manner as for the INSERT statement except that it determines the access path by which to access the record with predicate of (c1=5);
2. The query execution component 99 orchestrates access to the record with (c1=5). After this record is brought in memory, the query execution 99 sets up parameters for the efr-column as (efr, length=0, null indicator, data-values=zero); it then invokes the storage component 101 passing the address of the old record and values for the columns provided in the UPDATE call (in this case the efr column); and
3. For the efr column, the storage component 101 notes that the new value is NULL. Therefore, it determines the old server and filename from the old record. It then contacts the database agent 41 in that server, and issues UnLinkFile, providing it the filename, group-name (and other parameters).

DROP TABLE T1

In this example, assume an SQL DROP statement is used to delete the table from the database.

DROP TABLE t1

In the processing specific to the efr column, the metadata-definition component recognizes by looking up the RDBMS catalog that c3 is an efr column defined in table t1. It then issues UndefineGroup t1.c3 to the database agent 41. The database agent 41 unlinks all files in group t1.c3. Again this happens transactionally.

Referring to FIGS. 1 and 4 and to Appendix I, the control communication path 42 between the DBMS, APIs 40 and the database agent 41 is established according to a connection management API that is included in the APIs 40 and illustrated and described in Appendix I. The connection management API creates the control communication path 42 between the database system 12 and the file system 14 that supports exchange of information between the database system 12 and the file system 14. The Connect command establishes a session with the database agent on behalf of a named database. Relatedly, the path is described in Appendix I as a "connection", implying a network-supported communication between the database system 12, the file system 14, and the enterprise user's client application 80. This is not intended to limit the invention to being implemented strictly in a network, but merely to provide an example of a path between the database system 12 and the file system 14. In the connection management API there is illustrated and described a QueryLimits command that obtains limits for various parameters necessary for the connection as determined by a file manager in the file system with which the database system is communicating. This command is issued by the database agent 41 and provided to the connection management API to parameterize the communication path 42. In the form of a connection, the link is disestablished by the Disconnect command illustrated and described in Appendix I.

In the Read example described above, a "token" is set forth. In Appendix I, the token is referred to as an "authorization identifier". The authorization identifier is generated in the DBMS according to an encoding or encryption procedure known to the file system extension 44. The file system extension 44 validates the token by decoding or decrypting the filename in the inverse of the procedure used by the DBMS for encoding or encryption. The inventors contemplate the use of a known file naming convention in which a portion of the name can either be invariant or change over time with the change in the name of the file system. In this latter regard, the file name prefix management API illustrated and described in Appendix I would provide a DBMS with the means for correctly identifying a file system whose name would change with, for example, a change in its mount point over time. Relatedly, with reference to the description of the file name prefix management API, the inventors contemplate that the file name embodies two parts, prefix-name, and stem-name. The stem-name is considered to be time-invariant. However, the prefix-name can be changed by administrative commands of a database agent such as the database agent 41. When changing the prefix name, the database agent would assign a time-invariant prefix-id for prefix-name even though the prefix-name may change. In this case, the DBMS 15 stores the prefix-id and the stem-name in the efr-column of the database record when, for example, an INSERT call is issued. To support retrieval of the complete file name as a result of, for example, a SELECT call referencing an efr column, the DBMS must map a prefix-id to a prefix-name, for which purpose the file name prefix management API (one of the APIs 40) is provided. Preferably, the DBMS would build a cache of such mappings to reduce the message exchanges with the database agent. Such a cache is indicated in FIG. 1 by reference numeral 120.

In Appendix I, a transaction management API is illustrated and described. If the DBMS 15 is a transaction-based system, the transaction management API provides a transactional basis for conducting procedures and operations of the invention. Relatedly, a data recovery API is also illustrated and described in Appendix I for recovery of information maintained by a database agent when a database system having references to files in a file system where the database agent is located crashes. The APIs 40 of the database management system 15 also include a reconciliation API that reconciles database records with file system information in the event of interruption in the operation of a file system containing files referenced in the database system.

File System Architecture

The invention is intended for use with a filing system that is external to a database system. With reference to FIG. 1, the file system 14 is exemplary. Relatedly, although the file system architecture shown in FIG. 1 includes a file server 17 that executes a computer program embodying the file manager 18, this architecture only represents a preferred embodiment; in fact, the invention is intended to be used with other instantiations of generalized filing system architecture. Nevertheless, with reference to the preferred embodiment of the file system 14 that is illustrated in FIG. 1 and with further reference to FIG. 8, certain aspects of the architecture of the file system 14 will now be discussed.

The file manager 18 preferably embodies a computer program of the UNIX-type, of which the IBM AIX product is an example. In such a computer program, a file manager such as file manager 18 is commonly embodied in a computer program that includes a kernel such as the kernel 45. The file system extension 44 may be an extension of the kernel 45 and is allocated a set of functions that ensure authorized access to files of the file system. Among these functions are validating authorization of access to files in the file system. The file system extension's operations are invoked by the kernel 45 when the kernel receives requests to OPEN, RENAME, and DELETE files (among other requests). The kernel 45 receives such requests from file system users, from enterprise users, and from the database agent 41 (in, for example, the DeleteGroup and UnlinkFile commands). For an open/filename/token request from an enterprise user, the kernel 45 invokes the file system extension 44 to validate the unique token for file access by the enterprise user. For RENAME and DELETE requests from file system users and for DELETE requests received via database agent 41, the kernel 45 invokes the file system extension 44 with the request that the file system extension 44 check with the database agent 41 whether the file is linked or not. In this regard, the database agent 41 maintains its own persistent data structures such as the data structure 46 for tracking control information provided on a control link with a DBMS. Such control information includes, for example, group names, file names, access control, read-only, and recovery id information. Thus the database agent 41 informs the file system extension 44 as to control information, if any, asserted by a DBMS with respect to a file name found in the persistent data structure 46. If the database agent 41 informs the file system extension 44 that a file name is in the persistent data structure 46, the file system extension 44 rejects RENAME or DELETE requests directed to the named file from a file system user. If the DELETE request comes from the database agent 41, the file system extension 44 authorizes the requested operation. In this manner, a file system controls processing of files which have been adopted by a database system according to referential integrity constraints that include, without limitation, inhibition of RENAME and DELETE requests from file system users, read-only processing, if requested by the DBMS, and any other access control constraints communicated to the file system from the database system.

Figure 8:
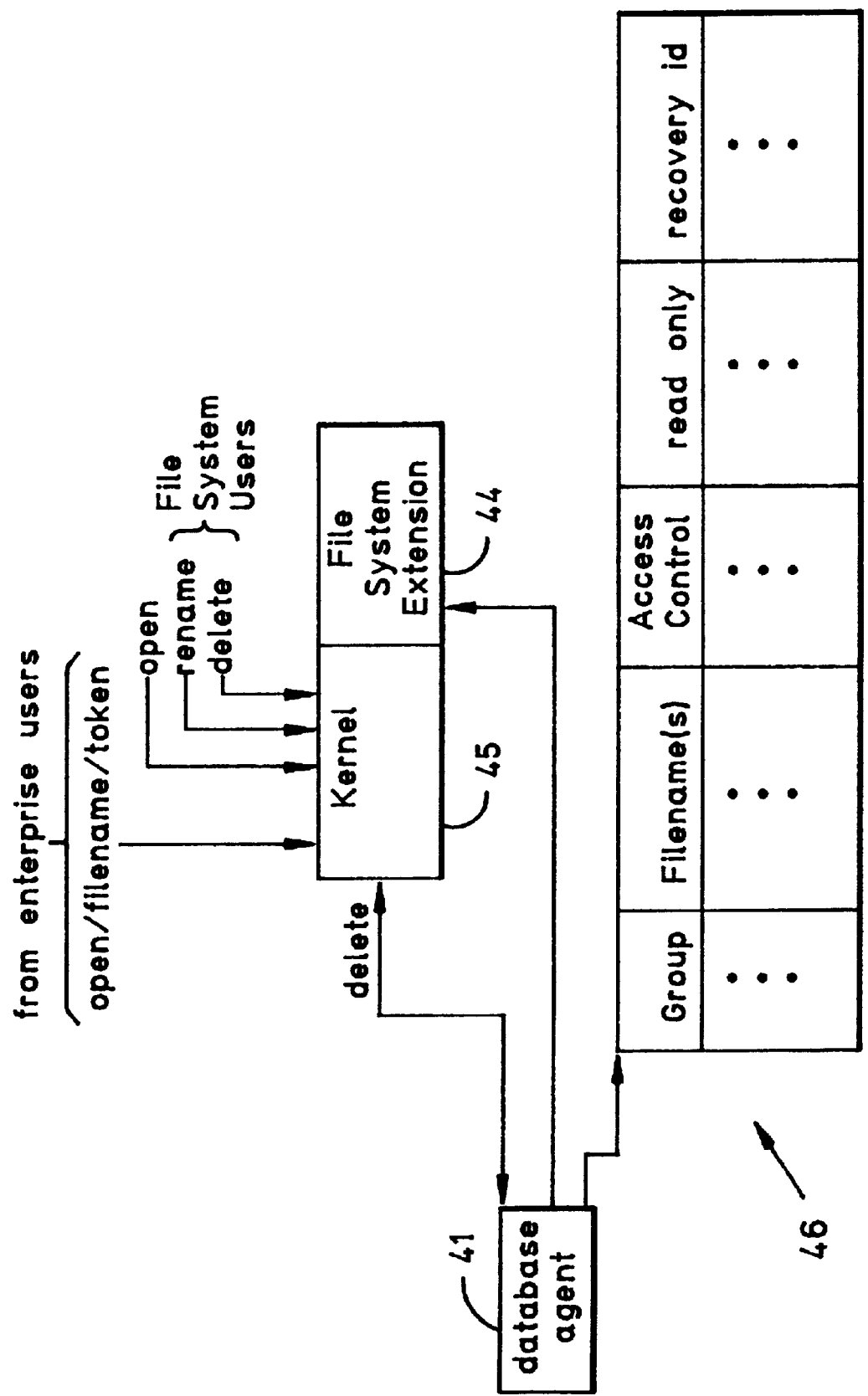
FIG. 8 is a block diagram showing the architecture of a file server.

With the preceding description of file system preferred embodiment, especially with reference to FIGS. 1 and 8, a more detailed description will now be given of processing according to the invention in response to an enterprise user's request directed to a DBMS for a file in a file system which the DBMS has linked. This processing is illustrated in FIG. 9; for consistency, FIG. 9 refers to DBMS 15, client application 80, file server 17 as shown in FIG. 6. In FIG. 9, the client application 80 forwards an enterprise user's request for the file named filename in the form of, for example, an SQL SELECT call in Step 1. The DBMS 15 using the SQL processing with extensions explained above generates the token 85, performs the query and returns the results together with the file name and token in Step 2. In Step 3, the file system API of the client application 80 issues a file system OPEN call in the form of open/filename/token to the file server 17 in Step 4. In Step 5, in response to OPEN call, the kernel 45 invokes the file system extension 44. In Step 6, the file system extension 44 begins OPEN processing, by validating the token and stripping it from the file name. The file system extension 44 then passes the OPEN call to the underlying file system in Step 7. In Step 8, the underlying file system conducts conventional OPEN processing, returning, in Step 9, to the file system extension 44. The file system extension 44 passes the results of the OPEN call back to the kernel 45 in Step 10. Kernel 45 in Step 11 passes the results of the OPEN call back to the client application 80.

FIG. 10 illustrates in detail the processing in the file server 17 in response to a RENAME or DELETE call, and shows how the processing of the file server 17 is controlled by control information received from the DBMS according to the invention. Assume that the DBMS has linked the file name /x/y that is controlled by the file server 17. Assume that a file system user in Step 1 requests that the file server 17 rename the file from /x/y to /x/b. The RENAME request is received in Step 2 by the kernel 45. In Step 3, the kernel 45 invokes and passes the RENAME request to the file system extension 44. In step 4, the file system extension 44 passes the request to the database agent 41 that asks whether the file /x/y has been adopted by the DBMS 15. In the example, the file has been adopted and this is indicated in Step 5(a) by the database agent 41 in a return to the file system extension 44. In this case, the file system extension 44 rejects the RENAME request in a return to the kernel's invocation, which is Step 6(a). The kernel 45 rejects the request in Step 7(a), passing the rejection to the file system user in Step 8(a).

Assume, now, that the file /x/y has not been adopted by the DBMS 15. In this case, the database agent 41 in Step 5(b) would answer no to the Step 4 request of the file system extension 44. The file system extension 44 would then invoke the RENAME processing of the underlying file system, the file system would conduct a RENAME processing returning the results to the kernel 45 in Step 6(b). The kernel would, in Steps 7(b) and 8(b) return confirmation of the RENAME to the file system user.

Figure 11:
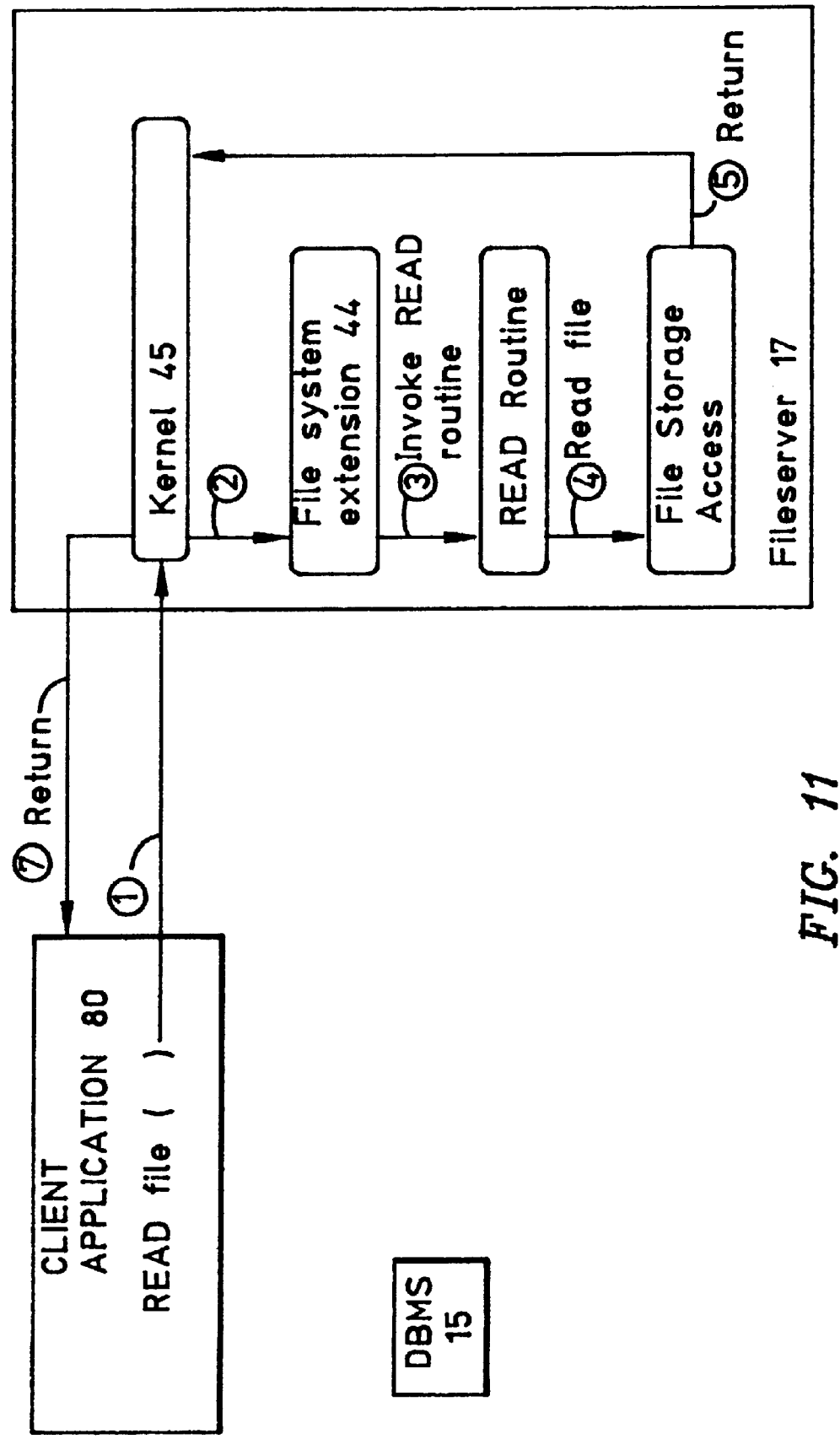
FIG. 11 is a process flow diagram illustrating a READ operation according to the invention.

The inventors contemplate that an enterprise user may act also as the file system user through the file system APIs in the client application 80. Thus, in FIG. 11, client application 80 issues a READ request initiated by an enterprise user. As FIG. 11 shows, the READ request is conventionally processed by the file server 17, returning results directly to the client application 80, bypassing DBMS 15 altogether. FIG. 11 further illustrates that conventional READ requests from an enterprise user are simply passed through the file system extension 44.

Figure 12:
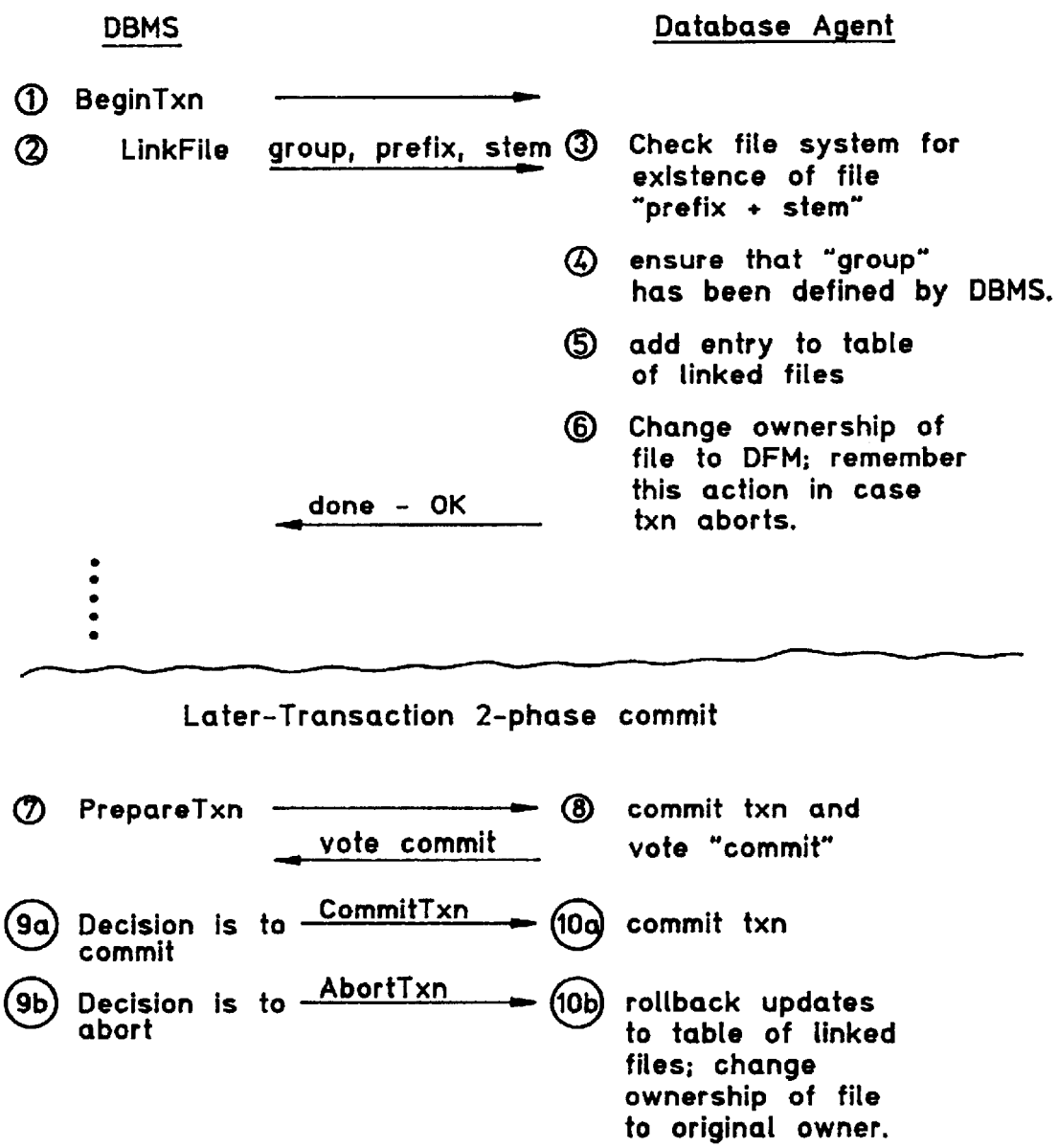
FIG. 12 is a process flow diagram illustrating a transactional context for the invention.

With reference now to FIG. 12 and to the transaction management API illustrated and described in Appendix I, LinkFile command processing in a transactional context will be explained. In this regard, prior to issuing a LinkFile command to the database agent 41, the DBMS 15 issues a BeginTxn command to the database agent 41. The database agent 41 undertakes conventional Begin transaction processing. The DBMS 15 then issues the LinkFile command including one or more references to files in the file system where the database agent 41 operates. In Step 3, the database agent 41 checks for the existence of the named file in the file system, in Step 4, the database agent ensures that the named group has previously been defined by the DBMS 15, in Step 5, the database agent adds the file name and associated file system processing control information into its persistent data, and the database agent invokes conventional file system processing to change ownership of the file to itself in Step 6. Steps 3–6 presume underlying processing to detect success or failure of the described operations. Further, during processing of Step 6, the database agent 41 logs actions taken in Steps 3–6 in case the transaction aborts. Following Step 6, the database agent 41 makes a conventional return to DBMS 15. Following the return, the DBMS 15 in Step 7 issues a PrepareTxn command, which is illustrated and described in Appendix I. In Step 8, the database agent 41 prepares to participate in conventional two-phase COMMIT processing, evaluates its transaction operations for commitment or rollback and votes accordingly in a return to the DBMS 15. Assuming that the DBMS decides to commit the transaction, the CommitTxn command illustrated and described in Appendix I is issued by the DBMS 15 to the database agent 41 in Step 9(a). In Step 10(a), the database agent 41 undertakes conventional commit processing to commit operations it has conducted during the transaction begun in Step 1. Assuming that the DBMS 15 decides to abort the transaction in Step 9(b), it issues an AbortTxn command to the database agent 41. In Step 10(b), the database agent 41 conducts conventional transaction rollback processing to rollback all operations bracketed in the transaction started in Step 1. It will be manifest to the reasonably skilled practitioner that the other file group and file management commands illustrated and described in Appendix I may also be conducted in a transactional context.

Figure 13:
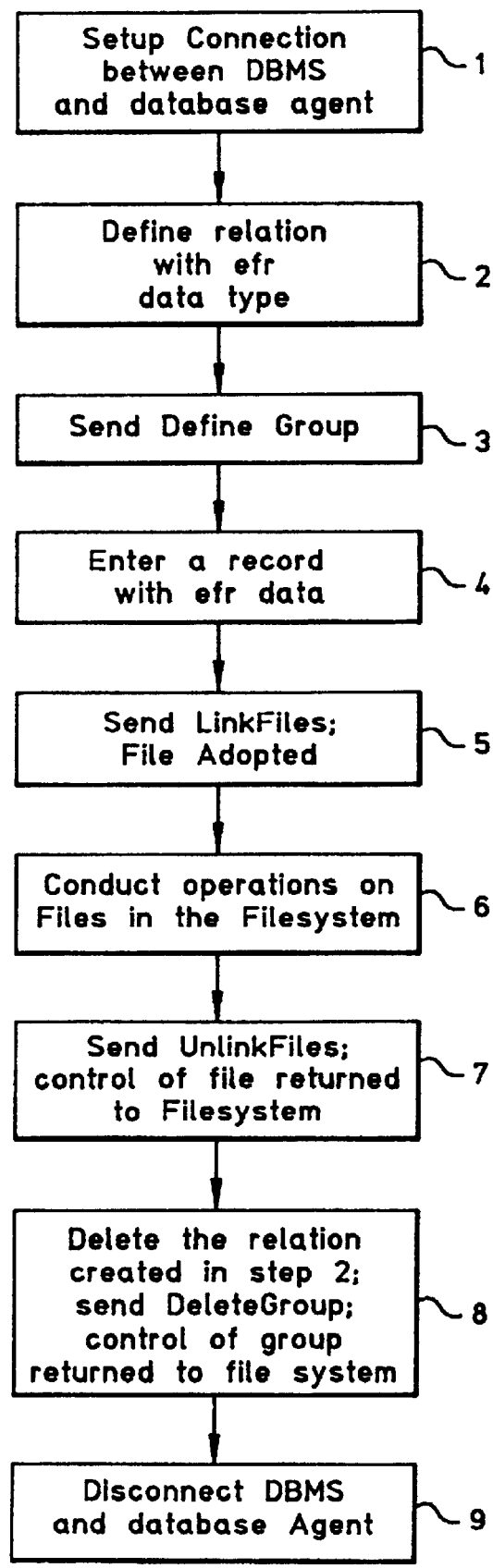
FIG. 13 is a process flow diagram illustrating an overall method according to this invention.

Now, with reference to FIGS. 1 and 13, the overall processing according to the invention will be explained. Initially, the database system 12 is presumed to be connected to a communications interface such as a network that provides communications with the file system 14. In Step 1, the database system 12 creates a connection with the file system 14, using the Connect command, and the connection is parameterized with the Query limits command. A relation with one or more efr data types is defined in the database system 12 in Step 2. In Step 3, the Define Group command is issued to the database agent 41. A tuple with a reference to a file in the file system 14 is entered into the relation in Step 4. In Step 5, a LinkFile command is issued to the database agent 41, causing the database agent to name the DBMS 15 as the owner of the named file in the file system 14. This control information causes the file system 14 to control processing according to the referential integrity constraints implicit in ownership of the file by the DBMS 15 (which include prevention of any file system user from deletion, renaming the file) and any other constraints explicitly included in the LinkFile command. Other processing according to the OPEN and READ examples given above may be conducted in Step 6. In Step 7, the file filename is unlinked by an UnlinkFile command, returning control by the file to the file system, or deleting the file altogether. In Step 8, the relation defined in,Step 2 is deleted, causing the DBMS 15 to issue a Delete Group command. In Step 8, the database agent 41 deletes the group named in Step 2, returning ownership of the files of the group to the file system 14, or deleting them altogether. In Step 9, the Disconnect command is issued, disestablishing the connection and breaking the link 41.

Figure 14:
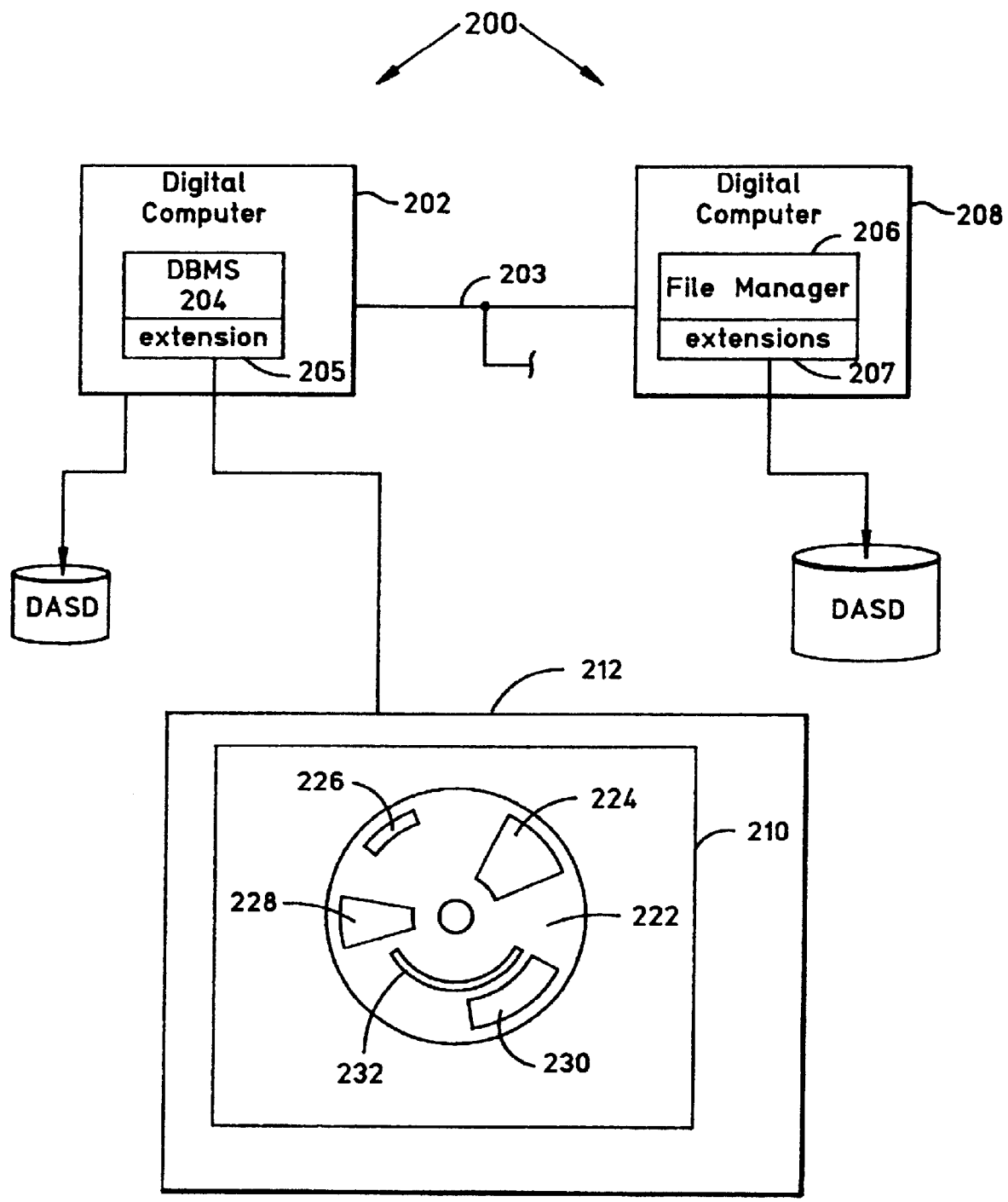
FIG. 14 is a block diagram illustrating a computer system with a computer program product in which the invention is embodied.

FIG. 14 illustrates a digital computer system 200 that can be programmed or otherwise designed to facilitate practice by the invention. As an example, the database system 12 of FIG. 1 can be implemented in a digital computer 202 of the RS-6000 type on which a DBMS 204 (such as the DB2 product available from the assignee of this application) may be installed. Alternatively, the database system may include the DB2 product executing on a System 390 mainframe computer. The file system 14 may include a file system 206, such as an AIX file system, executing on a digital computer 208 of the RS-6000 type. A communications facility 203, which may be a multinode network, couples the computers 202 and 208. The inventors point out that, while the -digital computers shown in FIG. 14 are separate, the initial reduction to practice of this invention was made using a single digital computer of the RS-6000 type on which the database and file systems were separately executed using the multiprocessing capability of the machine.

The invention is embodied in extensions 205, 207 to the DBMS 15 and file manager 18 that may be embodied in an article of manufacture such as one or more pre-recorded data-storage devices including the device 210. The pre-recorded data storage devices may include, for example, magnetically recorded disks or tapes, or optically recorded CD-ROMS. The APIs 40, which are described in detail in Appendix I and illustrated herein may be rendered as one or more computer software programs recorded on the pre-recorded data storage devices and integrated or linked with the DBMS 15 by conventional means including the storage drive 212.

Relatedly, the storage device 210 includes recording medium 222 on which is recorded program portions 224, 226, 228, 230, and 232, each for directing a digital computer, such as the digital computers 202 and 208 to facilitate the practice of some portion of the procedures of this invention. Even where no single program portion 224–232 includes the entire group of procedures described above, the portions may comprise all program means necessary to direct a digital computer to operate according to the invention. Therefore, it can readily be appreciated that a computer program product including the storage device 210, recording medium 222, and program portions 224–232 falls within the spirit and scope of the invention.

Backup

In this and the following sections the term "file manager" is used for convenience to denote, for example, the combination of the database agent described previously with a file server.

It is assumed that the database management system DBMS 15 of FIG. 1 includes the capability of performing a backup in which database contents are copied to stable storage. Typically, backup is performed on a recurring basis so that a library of backup copies may be maintained for a DBMS. Each backup copy is a snapshot of the database contents at the time that the copy was made. Each backup is, therefore, distinguishable from each other backup on the basis of some chronological mark such as a timestamp or a log sequence number (LSN). Typically, a database is restored from the most recent backup copy.

Depending on whether or not updates are permitted while backup is taken, the restoration of the database may require processing of log records to bring the database to its most recent state. This is typically the case when a hard failure occurs. However, when a soft failure occurs, it may not be desirable to restore the database to its most recent state since the soft failure may have corrupted the database. Restoration of a database to a state other than that represented by the most recent backup is referred to as "point-in-time" recovery.

In the invention, files referenced by efr fields in the attribute data of a database must be backed up in coordination with the backup of database contents. Further, restoration of the database to a particular state requires that the files referenced by the restored database contents also have the same state. Such restoration must take into account the possibility of deletion or creation of newer versions of references to files subsequent to the backup copy from which the database is restored.

One might expect that coordination of database backup with backup of external files could be accomplished by copying all files referenced by efr fields in the database contents at the time of backup. However, database backup is typically conducted a page at a time rather than a record at a time. Therefore reading each record at backup time to determine the location and name of each referenced file would significantly degrade the backup procedure. Further, copying a large number of objects of large size may take more time than copying database contents.

The invention maintains the performance of database backup, even with the presence of efr fields referencing external files, by initiating backup of a file when a DBMS transaction involving the LinkFile operation commits. The actual file backup is performed asynchonously with respect to the transaction involving the LinkFile operation. However, the file manager involved in the LinkFile operation notes persistently that the file needs to be backed up within the scope of the transaction.

Figure 15:
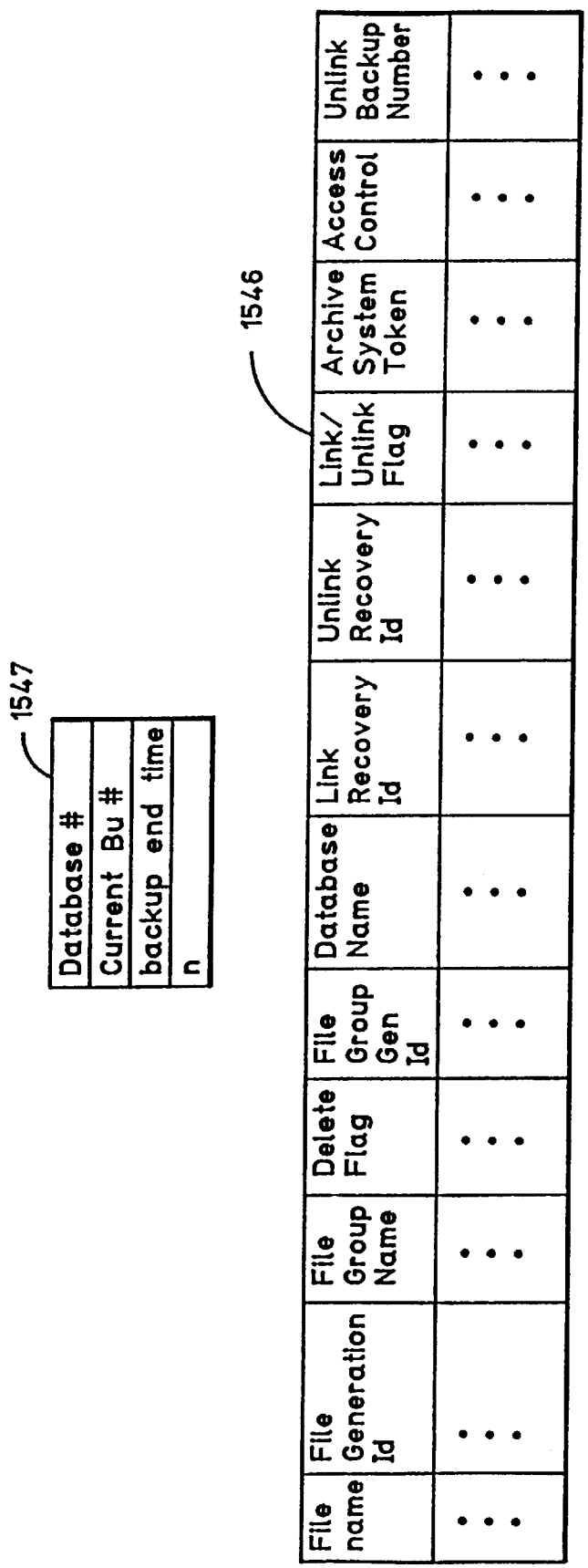
FIG. 15 is a diagram showing data structures maintained by a file system to support backup and restoration of a database system with links to files under control of the file system.

Referring to FIG. 15, persistent data structures maintained at a file manager to receive control information relevant to backup and restore operations are illustrated in FIG. 15. The data structure 1546 corresponds to the data structure 46 in FIG. 8 and includes, for each file under the control of the file manager and linked to a database system, fields for the filename that identifies the file, the FileGenerationId, the FileGroupName, a file group delete flag, the FileGroupGenerationId, the Database name, the LinkRecoveryId, the UnlinkRecoveryId, a link/unlink flag indicating whether the identified file is linked or unlinked to the named DBMS, an archive system token, the access control extended over the named file, and the Unlink Backup number (Bu#). Other fields, not illustrated, are provided for the additional information in the data structure 46 of FIG. 8.

Another data structure is maintained in a file manager for each DBMS to which it is connected. Once such structure is indicated by reference numeral 1547. Each such structure identifies a DBMS by a database name, and contains a current backup number (Bu#), a timestamp taken at the end of the current backupendtime and a number (n) of backups for which unlinked files are to be retained in the data structure 1546 after being unlinked.

With reference to FIG. 15, assume that a DBMS issues a LinkFile command including filename, FileGroupName, and RecoveryId parameters and a set readOnly flag. Assume further that the LinkFile operation is carried on in the transaction context explained earlier. In this regard, LinkFile processing is conducted at the file manager, including addition of an entry for the linked file to the table 1546. The entry for the linked file includes entering the filename, FileGroupName, and RecoveryId parameters, among others, and setting of the readOnly flag and the link state of the link/unlink flag. The file manager accepts the RecoveryId provided by the DBMS and enters it into the table 1546 as the LinkRecoveryId. The entry into the table therefore associates the LinkRecoveryId with the file being linked. Preferably the DBMS provides the RecoveryId as a unique identifier having chronological significance. For example, the log sequence number (LSN) and/or the timestamp at the time the LinkFile command was issued could be used. (For convenience and illustration the timestamp will be used as the chronological mark in the remainder of this description.) Assuming transaction processing according to FIG. 12, with commitment of the transaction, the DBMS issues a CommitTxn command. In response the file manager begins Commit processing, marking the file read-only and queuing a "Backup <filename>" message to an asynchronous daemon process for making the copy to the archive server. When the message is dequeued and processed by the archive server, a token is returned to the file manager and added into the archive system token field of the entry for the linked file. The token uniquely identifies the stored file to the archive server and, when required, is used for retrieving the file from the archive server.

When the DBMS begins a backup of the database system contents it must be assured that the asynchronous copy operations of linked files that were started since the immediately previous backup are complete. This is a sufficient check for two reasons. First, each file is marked readOnly when linked with the DBMS. Thus, the file cannot be updated while so linked. (To update the file, the old version must be unlinked and the new version linked. Each version of the file is tracked separately.) Second, completion of pending asynchronous copy operations is verified at every backup, so, by induction, it is sufficient to check completion of the copy operations initiated since the immediately previous backup.

Referring to section 7.0 of Appendix I, a BackupVerify API is provided for checking the completion of asynchronous copy operations. This API includes a parameter "sincetime", which is the end timestamp of the previous backup. The parameter "curtime" is the start-timestamp of the current backup. This API checks to insure the copying of the set of linked files satisfying the following condition:

curtime>LinkRecoveryID>sincetime

The file manager, using table 1546, scans the link/unlink, LinkRecoveryId and archive system token columns. For each filename in a linked state whose LinkRecoveryId satisfies the condition, the file manager determines, by the archive system token field, whether the file has been backed up by way of the archive server. If all files have been copied, then the BackupVerify API returns DFMRC_SUCESS. Otherwise, DFMRC_COPIES_IN_PROGRESS is returned. If copy operations for some files are still in progress, the DBMS continues its backup processing, copying the database contents. When the database contents are copied, the DBMS can again use BackupVerify to check whether the files in this set and any newly linked files have been copied. If the backup is "offline", database update processing does not continue concurrently, so no new LinkFile commands would be issued during backup. In all likelihood, the file manager would then return DFMRC_SUCCESS. Otherwise, the DBMS sets up an interval during which it would continue to check the return code from the file manager. In the extreme case where the file manager fails or some large interval has expired, the DBMS would fail the backup. A pseudocode segment to implement this procedure is illustrated in Table I.

TABLE I

PROCESSING FOR OFFLINE BACKUP

First Backup Verify call
   DFM_return_code_first_call = Backup Verify
   (connection handle, sincetime, curtime,

TABLE I-continued

PROCESSING FOR OFFLINE BACKUP

```
        filebackupmode = accelerated)
                /* sincetime is setup as follows
                /* sincetime = last-backup-end-time
                /* curtime - current time
Second Backup Verify call - Not always required
If DBMS Backup is successful so far then do
        If DFM_return_code_first_call=SUCCESS
        then do
                Issue BackupEnd (commit)
                        /* this call initiates garbage
                        collection process in the file manager */
                If any error
                        Fail DBMS Backup
                end
        Else do /* DFM_return_code_first_
        call=COPIES_IN_PROGRESS */
                DFM_return_code = COPIES_IN_PROGRESS
                Do until DFM_return_code=COPIES_IN_PROGRESS
                        /* Loop would break when DFM_return_
                        code=SUCCESS */
                        DFM_return_code = Backup
                        Verify (connection handle, sincetime,
                        curtime, filebackupmode = no-acceleration)
                        If DFM_return_code=COPIES_IN_PROGRESS
                        then do
                                Set timer wait
                        end /*if*/
                end /* Do Loop */
                If DFM_return_code_first_call=SUCCESS
                        Issue BackupEnd (commit)
                                /* this call initiates garbage collection process
                                in the file manager */
                Else If any error
                        Fail DBMS Backup
                end /* End Else */
end /* End backup successful */
Else do /* Backup failed */
        If DBMS Backup failed
        then do
        Issue BackupEnd (Abort)
        end
end
```

For an online database backup in which updates to the database are allowed while the backup is in progress, asynchronous copy to the archive server can be initiated as a result of a LinkFile operation during the backup. In this case, the DBMS must ensure that the files linked after the beginning of the backup are copied as well as those linked before the backup before it can declare the backup complete. Pseudocode for online backup is given in Table II.

TABLE II

PROCESSING FOR ONLINE BACKUP

```
For OnLine backup the main difference compared
to the Offline backup is that Backup Verify must be issued
at the end of backing up all database pages. The
curtime provided in the Backup Verify is the endbackuptime.
First Backup Verify call
        DFM_return_code_first_call = Backup Verify
        (connection handle, sincetime,
        curtime, filebackupmode = accelerated)
                /* sincetime is setup as follows
                /* sincetime = last-backup-end-time or LSN
                /* curtime - current time or current end of log
Second BackupVerify call - Always required
If DBMS Backup is successful so far then do
        If DFM_return_code_first_call=SUCCESS
                then do
                        sincetime = curtime
                end
```

TABLE II-continued

PROCESSING FOR ONLINE BACKUP

```
                DFM_return_code = COPIES_IN_PROGRESS
        curtime = current_time (or current end of log)
        Do until DFM_return_code = COPIES_IN_PROGRESS
                /* Loop would break when DFM_
                return_code = SUCCESS */
                DFM_return_code = Backup
                Verify (connection handle, sincetime, curtime,
                        filebackupmode = stop-accelerated)
                        /* sincetime is setup as follows
                        /* --if previous Verify said COPIES_IN_PROGRESS then
                        /*    sincetime = last-backup-end-time
                        /* --if previous Verify said SUCCESS then
                        /*    sincetime = previous backupverify's curtime
                        /* It is important to stop the accelerated
                        mode of copying files
                        /* when DBMS has finished its backup.
                        This is because it is not
                        /* urgent to make copies of the objects
                        which are linked after
                        /* the DBMS has made its copy.
                If DFM_return_code=COPIES_IN_PROGRESS
                then do
                        Set timer wait
                end /*if*/
        end /*Loop */
        If DFM_return_code=SUCCESS
                Issue BackupEnd (commit)
        Else If any error
                Fail DBMS Backup
        end /* end if DBMS backup successful */
Else do /* DBMS Backup failed */
        Issue BackupEnd (Abort)
end
```

For online backup processing, the DBMS must issue BackupVerify when the backup begins, and then again to complete backup processing. This is in contrast with offline backup processing where BackupVerfy is issued a second time only if the first BackupVerify returns DFMRC_COPIES_IN_PROGRESS. For online backup processing, the sincetime and curtime parameters for the second BackupVerify are set as follows:

1.) sincetime is initially set, with execution of the first BackupVerify, to the end-timestamp of the previous backup and then, with the second execution of BackupVerify, is moved forward to the timestamp taken before the second BackupVerify only if DFMRC_SUCESS is returned.

2.) curtime is set to the timestamp taken at the end of the database backup.

A further optimization is applied in order prevent degradation of the database backup due to the requirement to complete backup of external files. In this case the parameter filebackupmode of the BackupVerify API may have a value of 1 or 2. At the start of database backup, the DBMS sets filebackupmode=1 so that if a LinkFile command is issued during the period when the backup process is running, the files are copied expeditiously. This is accomplished by issuing a "Copy Immediate<filename>" message to the daemon process that interfaces with the archive server. At the completion of backup, the DBMS sets filebackupmode=2 to stop the acceleration. In any event, the file manager stops the acceleration mode when the BackupEnd command is issued by the DBMS to the file manager to indicate the outcome of the backup. This API tells the file manager whether the database has successfully completed the backup. If the database backup is successful, a garbage collection procedure is initiated by the file manager.

Figure 16:
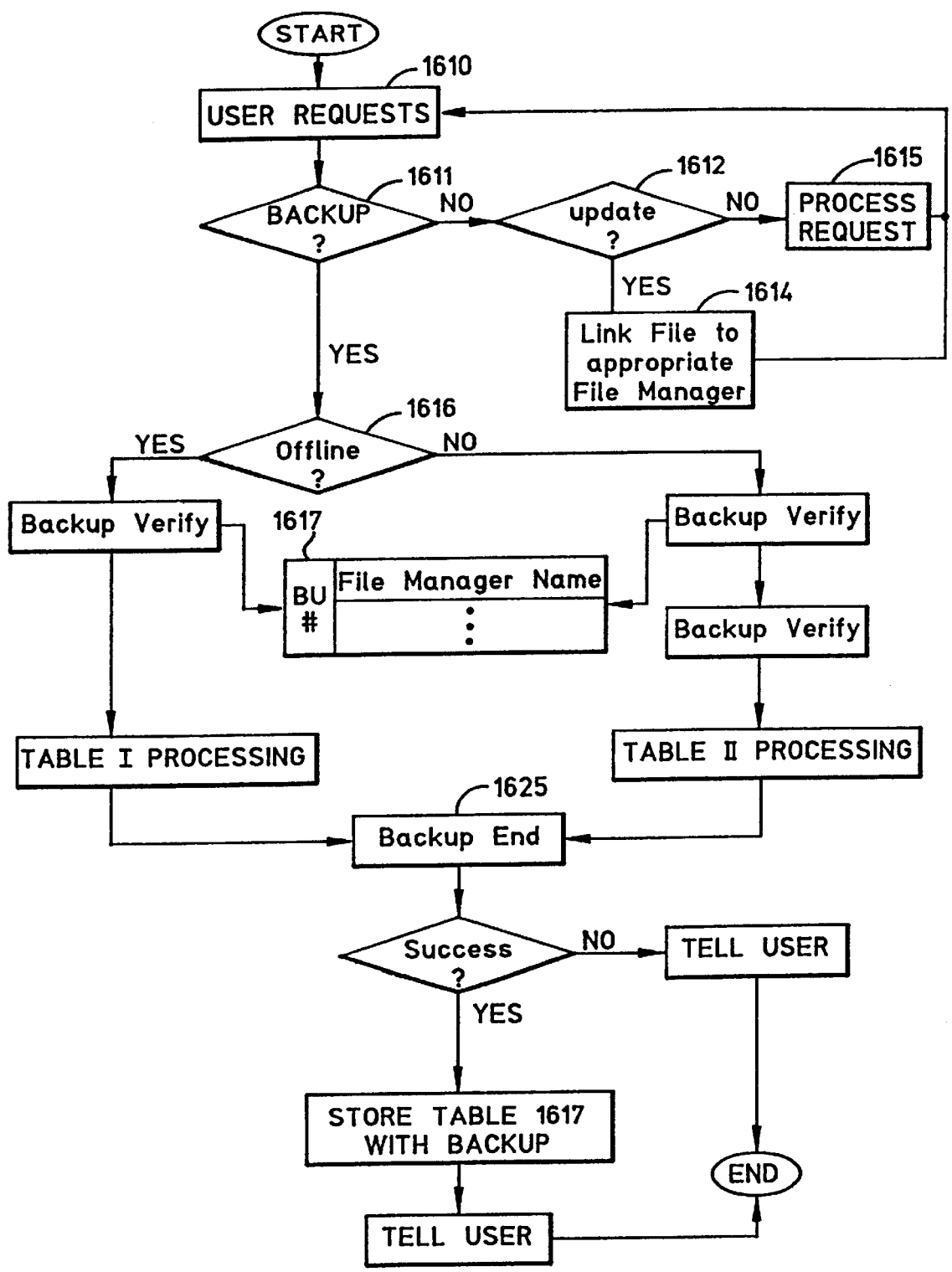
FIG. 16 is a flow diagram illustrating backup processing by a database system containing reference to files in a file system.

Backup processing from the standpoint of the file manager and DBMS that embodies the algorithms and APIs discussed above is summarized in FIGS. 16 and 17. In FIG. 16, backup processing from the DBMS point of view, after start of system operation prior to backup, a DBMS in Step 1610 processes user requests, conducting (it is assumed) one or more LinkFile operations as a result of database update transactions, each of which provides a LinkRecoveryId for each file linked. For so long as a backup is not initiated (Step 1611), the DBMS loops through 1610, 1611, 1612, 1614 or 1615, and 1610.

When a backup is initiated, the DBMS in Step 1616 determines whether the backup is online or offline. In either case, the DBMS first issues a BackupVerify to all file managers in the enterprise configuration. Since the handle for the BackupVerify identifies an established connection, those file managers that have not been connected to the issuing DBMS will return an error indication DFMRC_UNKNOWN_CONNECTION error indication. This enables the DBMS to keep track of the file managers that conduct backup processing in response to the BackupVerify. Manifestly, these file managers manage files referenced by database records of the DBMS. It should be evident that the database may reference files controlled by all or a subset the file managers defined in a configuration file maintained by the DBMS. This information is tracked during each backup in order identify those file managers maintaining information about the database being backed up. In this regard, a database may have been deleted or changed, but it may be necessary to restore it from an early version. When a database is deleted, the file managers do not delete information regarding the database, but keep the information for some period of time. When a database is restored to an earlier version defined by a particular backup and a file manager in the list of file managers tracked with that backup no longer manages information respecting the backed up database, the restore procedure must resort to a reconciliation which is described later. In view of these considerations, the DBMS maintains a list 1617 that is stored with the backup information. The list includes the BU# of the backup and all of the file managers participating in the backup.

Continuing with the description of FIG. 16, once the backup is initiated and a BackupVerify operations is stored, the DBMS processes as described above with respect to Tables I and II from decision Step 1616. Eventually, the DBMS starts a BackupEnd operation (step 1625) to indicate whether the backup completed successfully or not.

Figure 17:
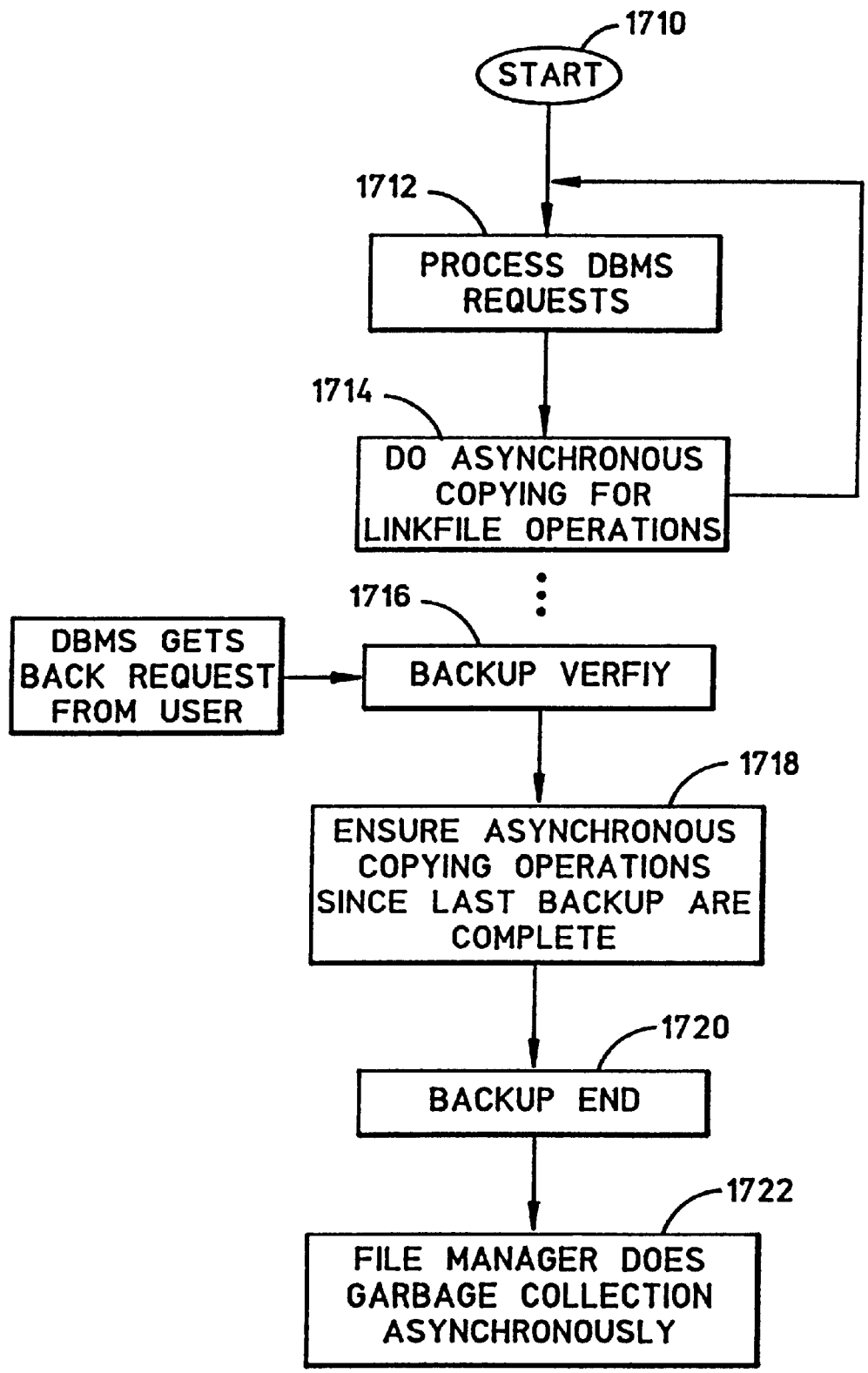
FIG. 17 is a flow diagram illustrating processing indicated by the file system in response to the database processing of FIG. 16.

FIG. 17 illustrates file manager processing according to the algorithms described above. In Step 1712, the file manager processes DBMS commands that include, without limitation, LinkFile and UnlinkFile operations. For LinkFile operations, the file manager in Step 1714 performs the asynchronous copying described above. In Step 1714, a precondition to linking a file and performing asynchronous copying is the validation of the RecoveryId received from the DBMS as a parameter of the LinkFile command. The value assigned by the DBMS to the RecoveryId parameter must be greater than the end time of the last backup for the DBMS. With reference to FIG. 15, for example the data structure 1547 maintained for database # includes a field backupendtime in which the timestamp of the last backup for database # is entered. If the stated condition is not met, the file manager returns DFMRC_RECOVERYID_INVALID, one of the returns set forth in the LinkFile API described in Appendix I. In response to this return, the DBMS can assign a new RecoveryId and reissue the LinkFile command.

Continuing with the description of FIG. 17, the file manager continues looping at 1715 until it receives a BackupVerify command in Step 1716, in response to which it accelerates asynchronous copying for any copy messages queued for that database. Next upon receipt of a BackupEnd command at 1720, the file manager commences garbage collection in Step 1722. Garbage collection is typically a "lazy" procedure that may be conducted as a background to Steps 1712 and 1714.

With respect to the file manager's processing illustrated in FIG. 17, it is pointed out that an UnlinkFile operation conducted by the file manager must take into account the possibility that asynchronous copy operation for the affected file has not completed. In this case, provision must be made for completing the operation before the file is unlinked. In this rare case, if, for example, a database update of an efr field causes the linked file to be unlinked, and the copy of the file has not yet been made, the unlink operation may be serialized with backup of the file. This is necessary since the file could be deleted from the file manager as a result of the unlinked transactions committing before the copy is made.

In conducting garbage collection, the file manager inspects its own metadata to determine whether it should delete information regarding unlinked files. For all unlinked files which it collects as garbage, the file manager must also notify the archive server 46 to delete stored copies of those unlinked files. In conducting garbage collection, account is taken of the fact that database backups are kept for certain period of time. Likewise, files that have been linked to, and then unlinked from, the database contents are kept in the archive server in case they need to be relinked to database contents restored from an earlier backup. In order to balance the metadata storage efficiency at the file manager with an effective restoration strategy, a database administrator must declare for how many backups unlinked files should be kept in the archive server. When the required number of backups have been performed, the unlinked files are then deleted from the archive server and the file manager's are metadata.

Unlinked files are therefore retained for a number ("n") of backups. When the "n+1"th backup is taken after a file has been unlinked, that file should be deleted from the archive server. In order to determine which unlinked file should be deleted, the file manager maintains, for each database with which it has relations, a data structure in which the number n, a backup sequence number (current BU#) and the timestamp of the current backup (backupendtime) are maintained. One such data structure is indicated by reference numeral 1547 in FIG. 15. As each backup is taken by a DBMS, the current BU# for that DBMS is incremented. At the time of an UnlinkFile operation, the current BU# is entered into the unlinked file's unlinked BU# field of the database structure 1546. Since an unlink operation can happen in between backup operations, the unlinked BU# entered into the data structure is one higher than the current BU# value. Concurrently, the link/unlink flag of the unlinked file is set to the unlink state.

Figure 18:
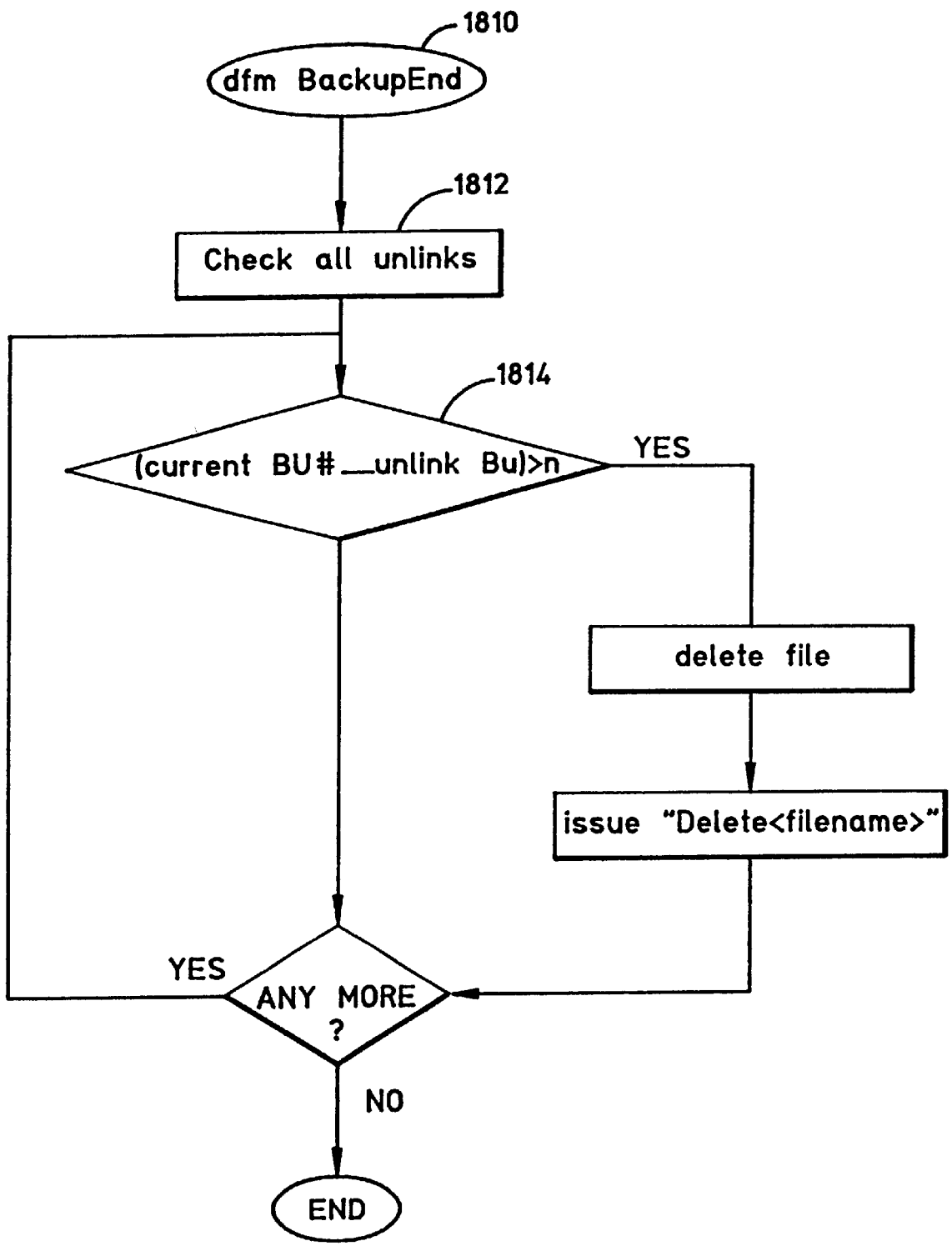
FIG. 18 is a flow diagram illustrating garbage collection in the file system.

When a database backup completes, garbage collection is initiated, if not already in progress. Garbage collection by a file manager, illustrated by the flow diagram of FIG. 18, begins with receipt of BackupEnd in Step 1810. Initially using the link/unlink flag, the file manager checks all unlinked files in its data structure 1546 in Step 1812. For each unlinked file the difference between the current BU# and the file's unlink BU# is compared to n in Step 1814. If the "n+1"th backup has not occurred since unlinking (negative exit from Step 1814), the file information is retained by the file manager and a copy of the file is retained by the archive server. On the other hand, when the "n+1"th backup is reached (positive exit from Step 1812), the unlinked file information is deleted from the file manager's data and a "Delete<filename>" message is issued to the daemon process.

Generally, garbage collection is initiated at the successful completion of a database backup. If garbage collection is already in progress, the current BU# is incremented and stored, for example in the data structure 1547 of FIG. 15. Because garbage collection is generally a "lazy" procedure, it is possible that it may not have completed by the time another database backup occurs. Though unlikely, more than one database backup could occur while a garbage collection procedure is ongoing. In this case, the garbage collection procedure must track persistently as to which particular backup or range of backups it is concerned with. That is, the garbage collection procedure must collect all unlinked files meeting the criteria for garbage collection. For example, assume that the garbage collection criteria (n) for unlinked files is 2. Assume further that the current BU# is 5. In this case, garbage collection collects all unlinked files associated with BU# 3. Assume that, during this garbage collection procedure, another database backup completes, and that the current BU# is incremented to 6. Assume further that the current garbage collection procedure is still active when BU#7 completes. Now, when the garbage collection procedure completes its processing for BU# 5, it compares the current BU# with its initiating BU#. Finding that the current backup is # 7, the garbage collection procedure records persistently that its collection scope covers all unlinked files associated with BU#4 or BU# 5. This way, the garbage collection procedure can consistently bring its processing current.

Restore

In the previous section, reference was made to an offline backup, during which no updates occur to data, and to an online backup, during which concurrent updates are allowed while the backup is in progress. In either case, the backed up information may be used to recover a database to a consistent state. The consistent state could be the state when the offline backup was taken. Such a state is referred to as Offline Backup state x or OFFBx for short. The consistent state could be the state at some point in log when no update was being allowed to the database. Such a state is referred to as a Quiesce Point, or QSCPT for short. The consistent state could be the state at the time of a crash, that is while the database is current, referred to as CURST. Last, the consistent state could be some arbitrary point in time, PITST.

As is known, for databases without references to external files, restoration from an offline backup (OFFBx Recovery) restores the database to a version consistent at some point in time. For QSCPT, restore processing applies log to the restored version of the database from when an appropriate copy was started to the point when the update transactions were quiesced. In this case, the database is brought to a state consistent with when the Quiesce Point was established.

With respect to OFFBx and QSCPT, recovery of a database containing efr fields referencing external files, additional processing is required to synchronize references to the external files with respect to the restored version of the database.

For recovery of a database with efr fields referencing external files up to a current state CURST, the DBMS must apply log to the point where the database closed after the calamity occurred. For point in time recovery, PITST the DBMS applies log only up to some arbitrary point in log, as for example to the point where an application corrupts database data. Applying log up to closures of the database after a calamity implies that the database was not in use after that point, in which case the database is brought to a consistent state. References to external files are synchronized for CURST recovery processing. However in the case of PITST when the log is applied up to some arbitrary log record earlier than the end of log, the database may not be restored to a consistent state. In this case, a manual action may be required of the user to bring the database a consistent point. Here, references to external files in database efr fields must be fixed.

Restore for OFFBx and QSCPT

Following is a description of an algorithm that illustrates the processing required to synchronize references to external files in a restored database with respect to metadata maintained by a file manager. Efficient synchronization is supported because the DBMS provides through the APIs described in section 6.0 of Appendix I, a "recovery id at linkage" and a "recovery id at unlinkage", which are entered by the file manager as the LinkRecorveryId and the UnlinkRecoveryId at link and unlink, respectfully. These RecoveryId's signify the time at which the associated operation completed. They are compared by the file manager with the timestamp of the offline backup up or the Quiesce Point to which the database is being restored. This value is provided by the DBMS in the form of Restore_Recovery_Id to the file managers which were involved in the back up. For restore processing, a file manager performs the following steps for the files which it tracks:

unlink all files whose link_recovery_ID is greater than (that is, later than) or equal to the restore_recovery_ID.

This would unlink all files which were linked after the quiesce point.

link all files whose
    ((link_recovery_ID is less than (that is, earlier than) restore_recovery_ID) AND
    (unlink_recovery_ID is greater than or equal to the restore_recovery_ID))

This would relink all files which were in linked prior to the quiesce point but were unlinked after the quiesce point.

Such reconciliation between the DBMS and the file data maintained by a file manager may be referred to as "reconciliation with respect to the RecoveryId". This is a highly efficient form of reconciliation processing and contrasts with a detailed reconciliation process performed by accessing each database record, determining filenames, and then reconciling with the appropriate file managers.

It should be noted that relinking a file after it was unlinked implies restoring the version of the file at the time it was linked. In this regard, the file manager requires the archive server to retrieve that version of the file, which was stored by the archive server during the backup processing described above. There are possibilities of various errors while restoring the file. For example, there may be a duplicate filename in the file manager. Any errors in file restoration will cause the DBMS to fail the reconciliation with respect to the RecoveryId procedure and initiate a detailed reconciliation between itself and the file manager as described in "Restore of Database for PITST."

Figure 19:
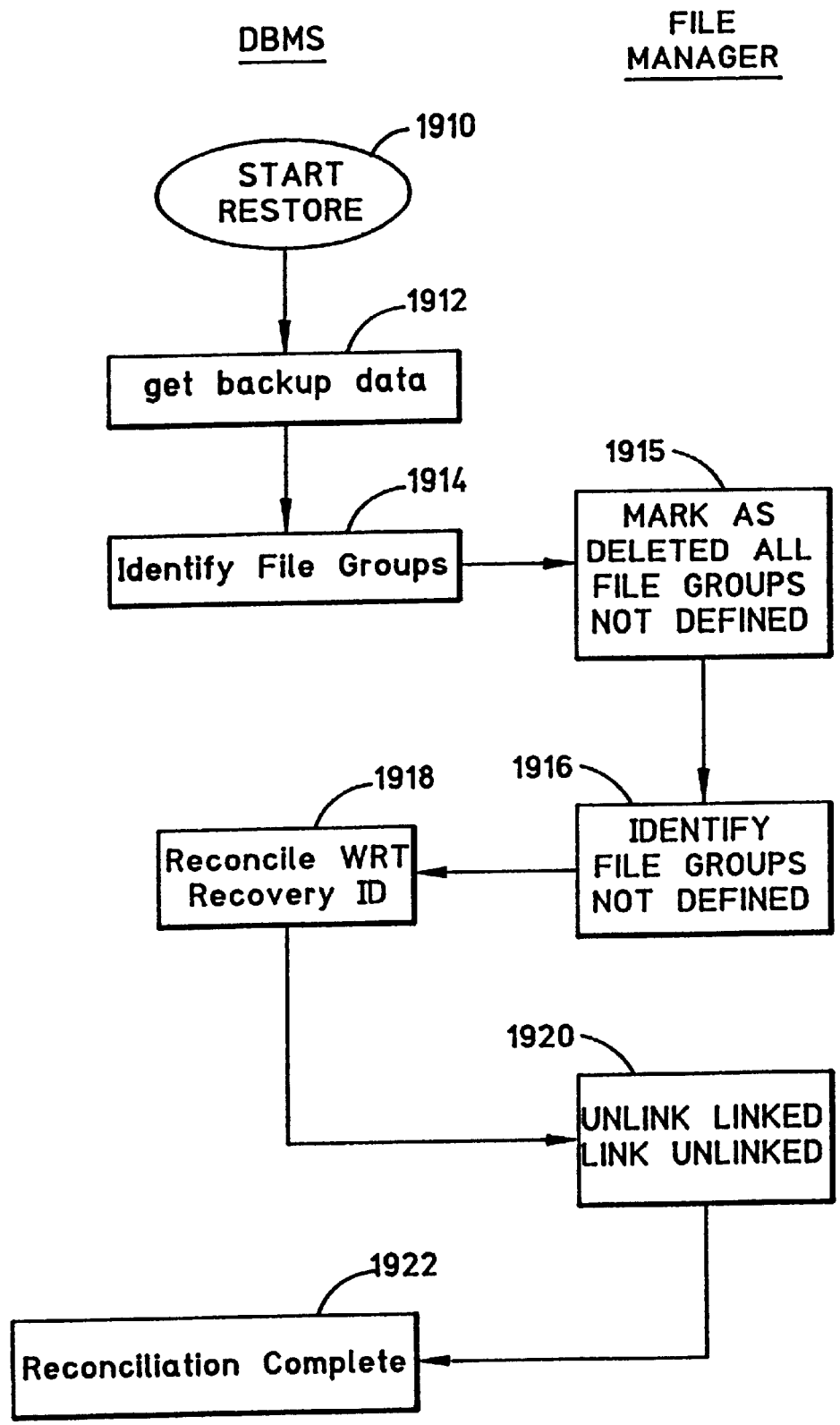
FIG. 19 is a flow diagram illustrating a first restoration process.

FIG. 19 illustrates processing by a DBMS and a file manager in performing the just-described algorithm. Initially, a restore is begun in Step 1910 in the DBMS. In Step 1912, the DBMS has access to the backup data that includes database contents, attribute data, and associated file managers at the time of the backup. The DBMS in Step 1914 conducts reconciliation processing using the API 8.0 in Appendix I. In this regard, API 8.1, 8.2, 8.3 are invoked to allow the DBMS to ensure that the appropriate file groups are defined in a file manager. For example, if a file group has been deleted by the DeleteGroup API (4.2, Appendix I) with a keepunlinkedfilesafterdeletegroup value of non-zero which has been exceeded, is not possible to reconcile files in this group. However, if a file entry exists in the file manager's metadata as in the data structure 1546, but is in the deleted state, it may be possible to reinstate it and perform reconciliation. Furthermore, other file groups which do not exist in the backup database contents should be marked as deleted. In Step 1914 the DBMS sends a list of file groups which are valid on the DBMS side. The API ReconcileGroupdDefEnd causes the file manager, in Step 1915, to initiate the deletion of all file groups not associated with a set of file groups identified Step 1914. Further, in Step 1915, the file manager revives the file groups identified by DBMS if they were in the deleted in the state by resetting the state of the associated delete flags. If necessary, in Step 1916, the file manager identifies the file groups it does not have. If the file manager does not have a file group identified by the DBMS, the DBMS may take appropriate action to alter or terminate restore processing. A database administrator may have to resort to appropriate procedures in this circumstance. The invention does not cover the several options available at this point.

In Step 1918, the DBMS invokes the API ReconcileWRTRecoveryId. In this step, the DBMS provides the Restore_Recovery_Id as the recoveryId in the ReconcileWRTRecoveryId API. In Step 1920, the file manager performs the unlink/link algorithm described above. If all the file groups are successfully processed in this regard, DRMRC_SUCCESS is returned and the reconciliation is completed in Step 1922. An Error return from Step 1920 implies that an error occurred for one or more file groups. Relatedly, a link/unlink processing error can occur for a number of reasons. For example, while relinking an earlier-unlinked file, another file with the same name may exist in the file manager. Other error instances would arise when there is no available storage space in the file manager, or when the archive server could not provided the requested file because of media errors. In the event of such an error, the DBMS would determine accepted file groups using the RWReadExpectionGroups API. In this case, the DBMS may make data unavailable for those file groups or may use s reconciliation procedure described below for those file groups.

Restore of Database for PITST

After restoring a database from a backup file made while concurrent updates where going on, log has to be applied to the restored copy. This process is called rollforward. If rollforward is performed to the end of the log, the processing ensures transactional consistency between database references to files and a filing system. Therefore, there is no additional processing necessary when efr columns are defined in the database.

Rollforward to an arbitrary point in the log requires placing the database in a pending state while reconciliation proceeds. In this case, Data Recovery APIs described in section 9.0 of Appendix I are executed. These APIs are used by a reconciliation utility. The reconciliation utility performs processing to ensure that a file referenced in a restored database is in the linked state and belongs to the same file group in the file manager as in DBMS. This requires action by the file manager to ensure that its metadata reflects that a file is linked and is in the proper file group. Further, the file manager must unlink any linked files that are not referred by the restored database contents and must obtain from the archive server copies of any files whose versions have changed or that have been deleted. Reconciliation using the reconcile utility is performed in the transactional context since there may be several interactions between the DBMS and the file manager to provide filenames.

Figure 20:
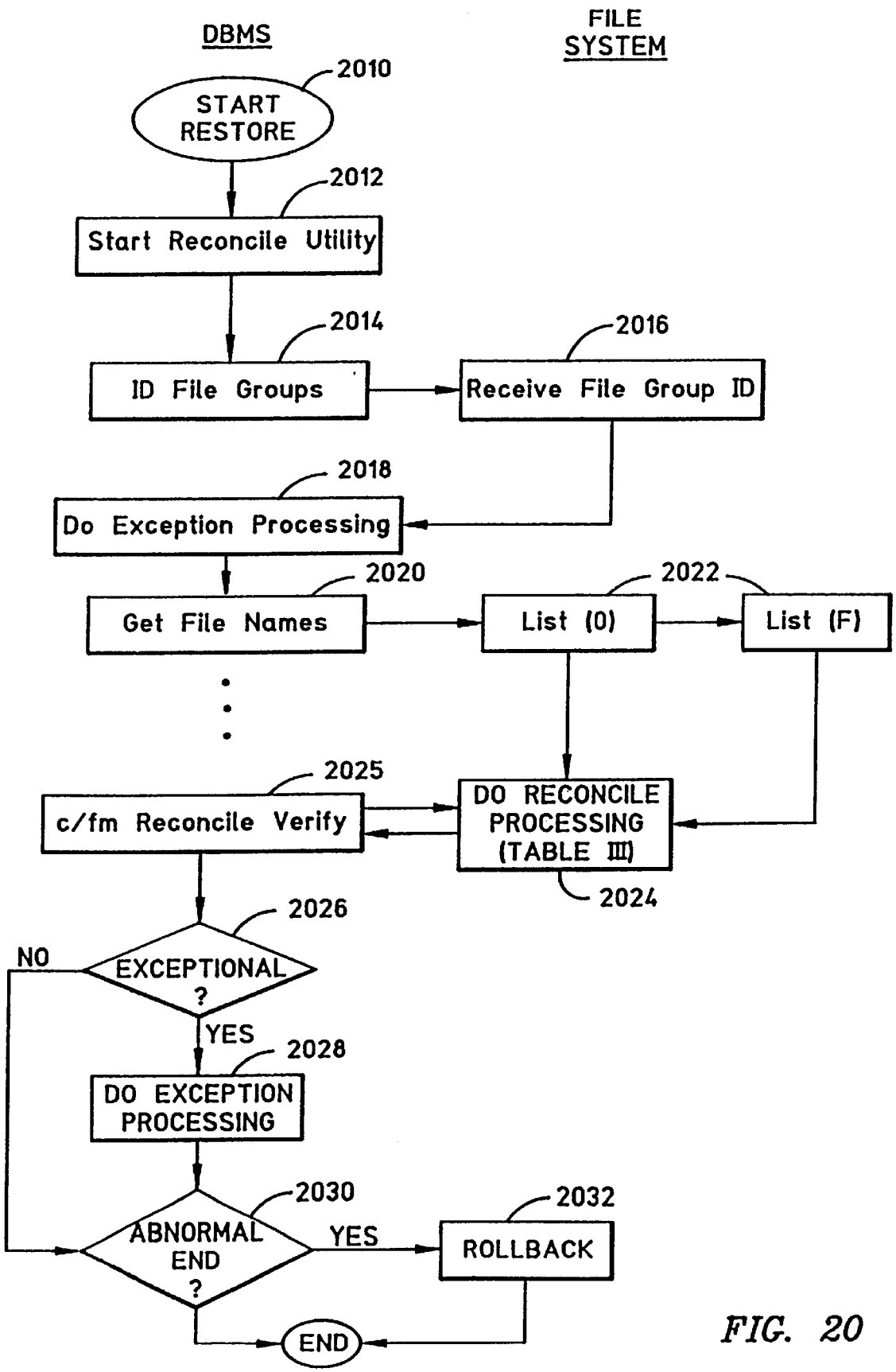
FIG. 20 is a flow diagram illustrating a second restoration process.

With reference now to sections 9.0–9.6 of Appendix I and to FIG. 20, a DBMS begins a restore procedure in Step 2010. Once the affected database has been restored to a state defined by a backup, the DBMS begins reconciliation in Step 2012. In Step 2014, ReconcileStart is executed, allowing the DBMS to identify file groups to a file manager involved in the backup that underpins the restoration. The file manager in Step 2016 checks its metadata, comparing the list of file groups for which reconciliation is to be conducted. In the event that an identified file group is not defined at the file manager, an exception is returned to the DBMS identifying one or more undefined file groups. In the event of an exception, the DBMS can either abort the restore process or perform exception processing in Step 2018. Exception processing may include continuing reconciliation while excepting tables in the restored DBMS data that correspond to the excepted groups. The DBMS continues the reconcile utility in Step 2020 by one or more calls to the file manager in which filenames, row-ids to which they belong, and associated file groups are passed to the file manager. This is done by way of the ReconcileSendFileInfo API. One, or a series of this API may be used to send all filenames in the stored database. By the ReconcileEndFileInfo by which the DBMS declares to the file manager that it has sent all filenames and related information to the file manager for the restoration. The filenames passed to the file manager are assembled into a list (list (D)) by the file manager in Step 2022. At this point the reconcile procedure enters a verification phase that commences with processing by the file manager in Step 2024 and proceeds asynchronously with respect to ReconcilEndFileInfo.

During verification, the DBMS may use the ReconcileVerify API in step 2025 (Appendix I, 9.3) to check the status of the verify phase. When the file manager completes verification, it provides a count of files requiring exception processing by the DBMS.

In the verification phase, filenames from the DBMS in list (D) are compared with a list of files maintained by the file manager, that have been linked to database contents using a LinkFile operation. This list may be termed list (F). In this regard, list (F) would include data contained in the data structure 1547 of FIG. 15 showing the files that are currently linked, and those that have been unlinked and not deleted through garbage collection. In Step 2024, the file manager sorts the filenames in list (D) and the filenames in list (F) and compares these sorted lists. The comparison process performed by the file manager is illustrated in Table III. In this processing, assuming that a file is contained in list (D) and in list (F), and further that the file group identification for the file in list (D) has the same identification as for the file in list (F), the file manager ensures that, if the file in list (F) is linked, the correct version of the linked file is restored from the archive server. If the file in list (F) is unlinked, the file is restored from the archive server and marked as linked in the file manager data. For identically named files in list (D) and list (F) that are not in the same group, the filename and associated information is put in an exception list. Files that are named in list (D) but not in list (F) are also put in the exception list. Files that are listed only in list (F) are marked as unlinked at the file manager. Following completion of processing in Step 2024, the file manager returns a field in which the count of exceptions is reported. This field is inspected by the DBMS in Step 2026. If the count is nonzero, exception processing is conducted in Step 2028 through the ReconcileRcvExceptionData API. In exception processing Step 2028, the DBMS acquires from the file manager a list of filenames, in list (D) that, for one reason or another, cannot be linked by the file manager. In this step the DBMS may remove the tuples from the database corresponding to the row-ids that have been reported in the exception list. By removing such entries from the database, the DBMS can make the rest of the data available for use. After determining the cause of entries in the exception list, and taking appropriate manual actions on the file server, the tuples with exceptions may be reintroduced into the database.

Step 2030 represents the ReconcileAbnormalEnd API by which the DBMS can terminate the reconcile process for any number of reasons. In Step 2032, the DBMS can rollback the ongoing reconcile process for any number of reasons. The processing on the file manager side is to clean up temporary resources associated with the reconcile process.

TABLE III

```
if a file is in list D and in list F
    if file group-id for file in list D is same as file group-id in list F
        if file in F is in linked state
            if version# in D not equal to version# in F
                restore file from archive server
                if fail, put file and associated information in exception list
                else
                    Update File manager entry with correct version#
                    Delete unneeded version from archive server
        if file in F is in unlinked state
            restore file from archive server
            if fail, put file and associated information in exception list
            else
                Update File manager entry that file is linked
    else   /* group-id is not the same */
        put file and associated information in exception list
    else   /* file missing from either list D or list F */
        if file is in list D but not in list F
            put file and associated information in exception list
        if file is not in list D but in list F
            Update File manager entry that file is unlinked
            /* the file would be garbage collected later */
```

With reference again to FIG. 14, it is asserted that the API's discussed herein, as well as the backup and reconciliation processing described for file manager may be embodied in the form of instructions programming encoded on a storage medium.

Further, it should be manifest that many other embodiments and variations of this invention may occur to the skilled artisan applying these teachings to a particular problem. One evident variation is the use of the invention in an enterprise system that includes a database system and a filing system (as defined in the Background) that is external to the database system. The invention, therefore, is limited only by the following claims.

We claim:

1. A method of restoring a database system having references to files stored in at least one file system external to the database system, comprising the steps of:

placing in the database a reference to a file in the file system;

making a record in the file system of the reference, the record initially indicating the existence of the reference, the records being changed to indicate deletion of the reference if the reference is deleted from the database system;

initiating a restoration of database contents that existed at a time of database system operation (restore time); and (a) if the reference is placed in the database system prior to the restore time and the record indicates that the reference was deleted, changing the reference to indicate that the reference exists; or (b) if the reference was placed in the database system subsequent to the restore time and the record indicates that the reference exists, changing the record to indicate that the reference is deleted.

2. The method of claim 1, the record including a recovery time having a value corresponding to a time when the reference was placed in the database system, step 10(a) being performed if the recovery time is earlier than the restoration time.

3. The method of claim 2, step 10(b) being performed if the recovery time is later than, or equal to, the restored time.

4. The method of claim 1, wherein the step of initiating includes providing to the file system a list of references to files in the file system that exist in the restored database contents and step 10(a) is performed if a reference to the file is in the list.

5. The method of claim 4, wherein step 10(b) is performed if no reference to the file is in the list.

6. The method of claim 1, further including the steps of:

determining that either step 10(a) or 10(b) cannot be performed;

providing to the database system an indication that either step 10(a) or step 10(b) cannot be performed; and removing the references from the restored database contents.

7. A method performed in a file system to reconcile file data indicating references made in the contents of a database system to files in the file system, the method comprising the steps of:

making a record in the file system of a reference made in the contents of a database system to a file in the file system, the record initially indicating the existence of the reference in the database system, the record being changed to indicate deletion of the reference if the reference is deleted from the database system;

receiving an indication from the database system of the restoration of a database system with database contents that existed at a time of database system operation (restore time); and (a) if the reference was placed in the database system prior to the restore time and the record indicates that the reference was deleted, changing the reference to indicate that the reference exists; or (b) if the reference was placed in the database system subsequent to the restore time and the record indicates that the reference exists, changing the reference to indicate that the reference is deleted.

8. The method of claim 7, the record including a recovery time having a value corresponding to a time when the reference was placed in the database system, step 16(a) being performed if the recovery time is earlier than the restore time.

9. The method of claim 8, step 16(b) being performed if the recovery time is later than, or equal to, the restore time.

10. The method claim 7, wherein the step of receiving an indication includes receiving from the database system a list of references to files in the file system that exist in the restored database contents, and step 16(a) is performed if a reference to the file is in the list.

11. The method of claim 10, wherein step 16(b) is performed if no reference to the file is in the list.

* * * * *